(12) United States Patent
Grimaldo et al.

(10) Patent No.: US 11,318,825 B1
(45) Date of Patent: May 3, 2022

(54) SUNROOF DRIVE APPARATUS AND RELATED SUNROOF ASSEMBLIES FOR USE WITH VEHICLES

(71) Applicant: AISIN TECHNICAL CENTER OF AMERICA, INC., Northville, MI (US)

(72) Inventors: Jacob Grimaldo, Westland, MI (US); Micah Wedekind, Livonia, MI (US); Michael Mixon, Brighton, MI (US); Tatsuya Matsui, Novi, MI (US)

(73) Assignee: AISIN TECHNICAL CENTER OF AMERICA, INC., Northville, MI (US)

( * ) Notice: Subject to any disclaimer, the term of this patent is extended or adjusted under 35 U.S.C. 154(b) by 15 days.

(21) Appl. No.: 17/073,594

(22) Filed: Oct. 19, 2020

(51) Int. Cl.
| | |
|---|---|
| *B60J 7/053* | (2006.01) |
| *B60J 7/02* | (2006.01) |
| *B60J 7/043* | (2006.01) |
| *B60J 7/047* | (2006.01) |
| *B60J 7/19* | (2006.01) |
| *B60J 7/057* | (2006.01) |

(52) U.S. Cl.
CPC ............... *B60J 7/053* (2013.01); *B60J 7/022* (2013.01); *B60J 7/192* (2013.01); *B60J 7/024* (2013.01); *B60J 7/043* (2013.01); *B60J 7/047* (2013.01); *B60J 7/0435* (2013.01); *B60J 7/057* (2013.01); *B60J 7/0573* (2013.01)

(58) Field of Classification Search
CPC ............ B60J 7/022; B60J 7/024; B60J 7/043; B60J 7/047; B60J 7/053; B60J 7/057; B60J 7/0435; B60J 7/0573
USPC .................................. 296/216.02–0.05, 223
See application file for complete search history.

(56) References Cited

U.S. PATENT DOCUMENTS

| | | | | |
|---|---|---|---|---|
| 4,245,864 | A * | 1/1981 | Shitanoki | .............. B60J 7/024 296/222 |
| 10,611,216 | B1 | 4/2020 | Katsura et al. | |
| 10,647,185 | B2 | 5/2020 | Grimaldo et al. | |

(Continued)

FOREIGN PATENT DOCUMENTS

DE 20309889 U1 * 8/2003 .............. B60J 7/022

OTHER PUBLICATIONS

Inventor name not available, Webasto Vehicle Sys, "Guide rail for vehicle sunroof, comprises pair of sheet metal profiles with flanges enclosed in plastic moulding", Aug. 28, 2003, German Patent Office, Edition: DE20309889U1 (Year: 2003).*

*Primary Examiner* — D Glenn Dayoan
*Assistant Examiner* — Joyce Eileen Hill
(74) *Attorney, Agent, or Firm* — Oblon, McClelland, Maier & Neustadt, L.L.P.

(57) ABSTRACT

Sunroof drive apparatus and related sunroof assemblies for use with vehicles are disclosed. A disclosed assembly includes a sunroof panel, a rail, a guide block attached to part of the rail, a bracket beneath the sunroof panel, a link in the rail removably connected to the guide block, and a drive shoe in the rail slidably coupled to the link. The drive shoe includes first and second slots to receive respective first and second pins of the link. The link can rotate about a rotation axis from a first orientation in which the link is inseparable from the guide block to a target orientation in which the link is separable from the guide block. When the first pin enters a locking area at an end of the first slot, the drive shoe imparts one or more loads on the first pin that urge the link into the target orientation.

11 Claims, 17 Drawing Sheets

(56) References Cited

U.S. PATENT DOCUMENTS

2006/0006700 A1\* 1/2006 Manders ............... B60J 7/0435
296/216.03

\* cited by examiner

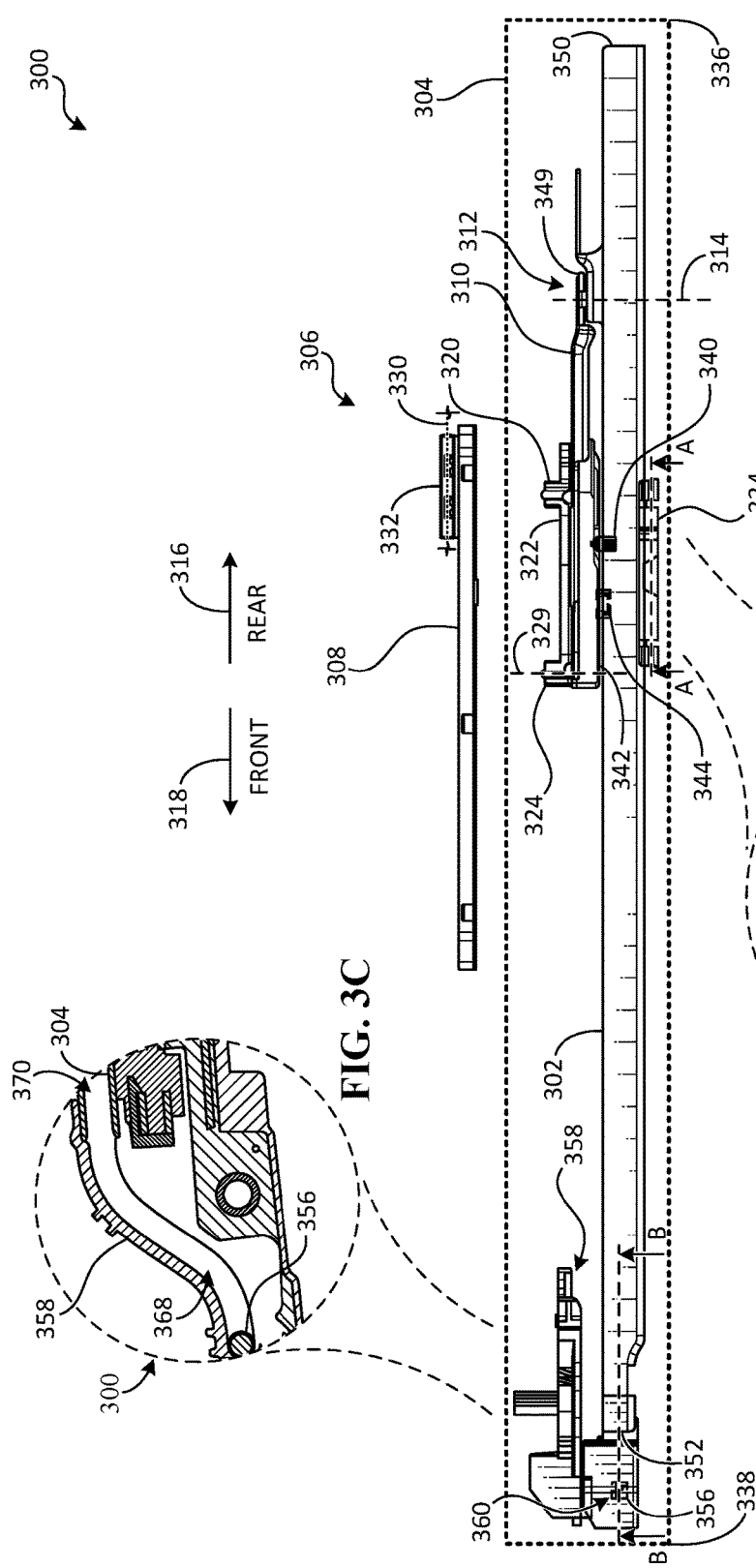

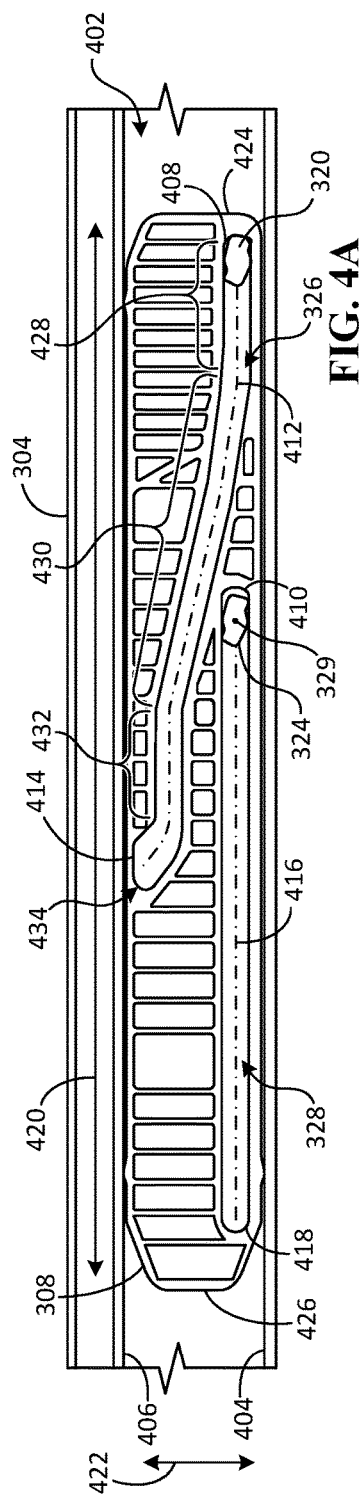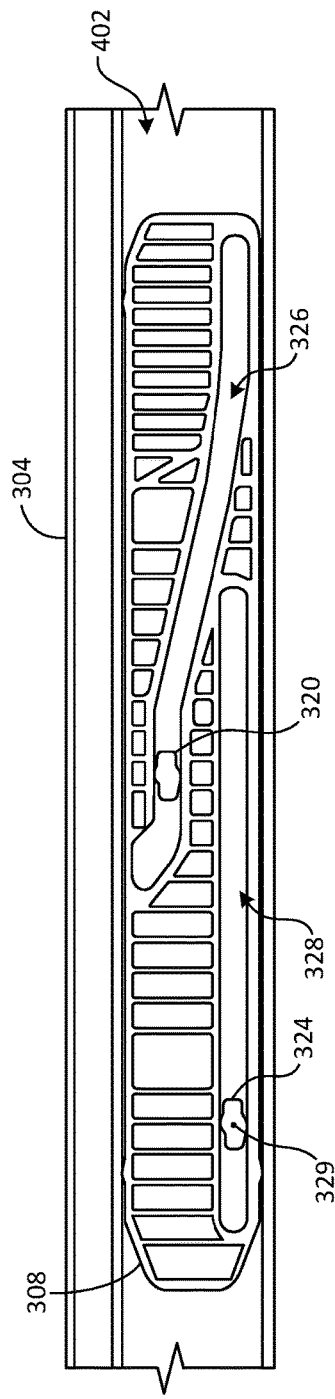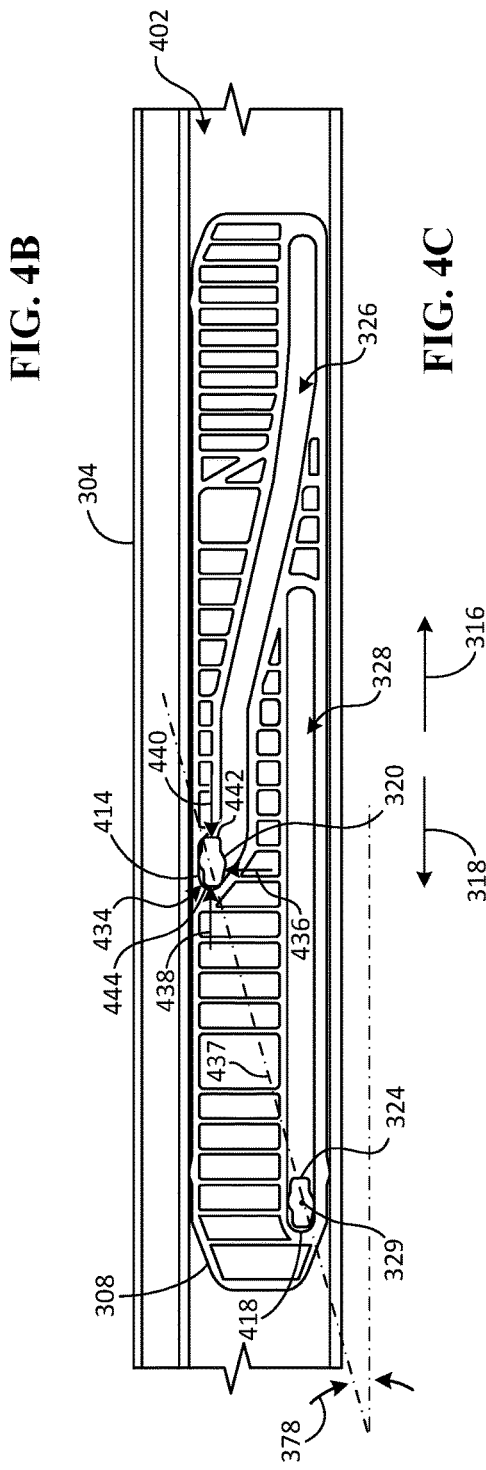

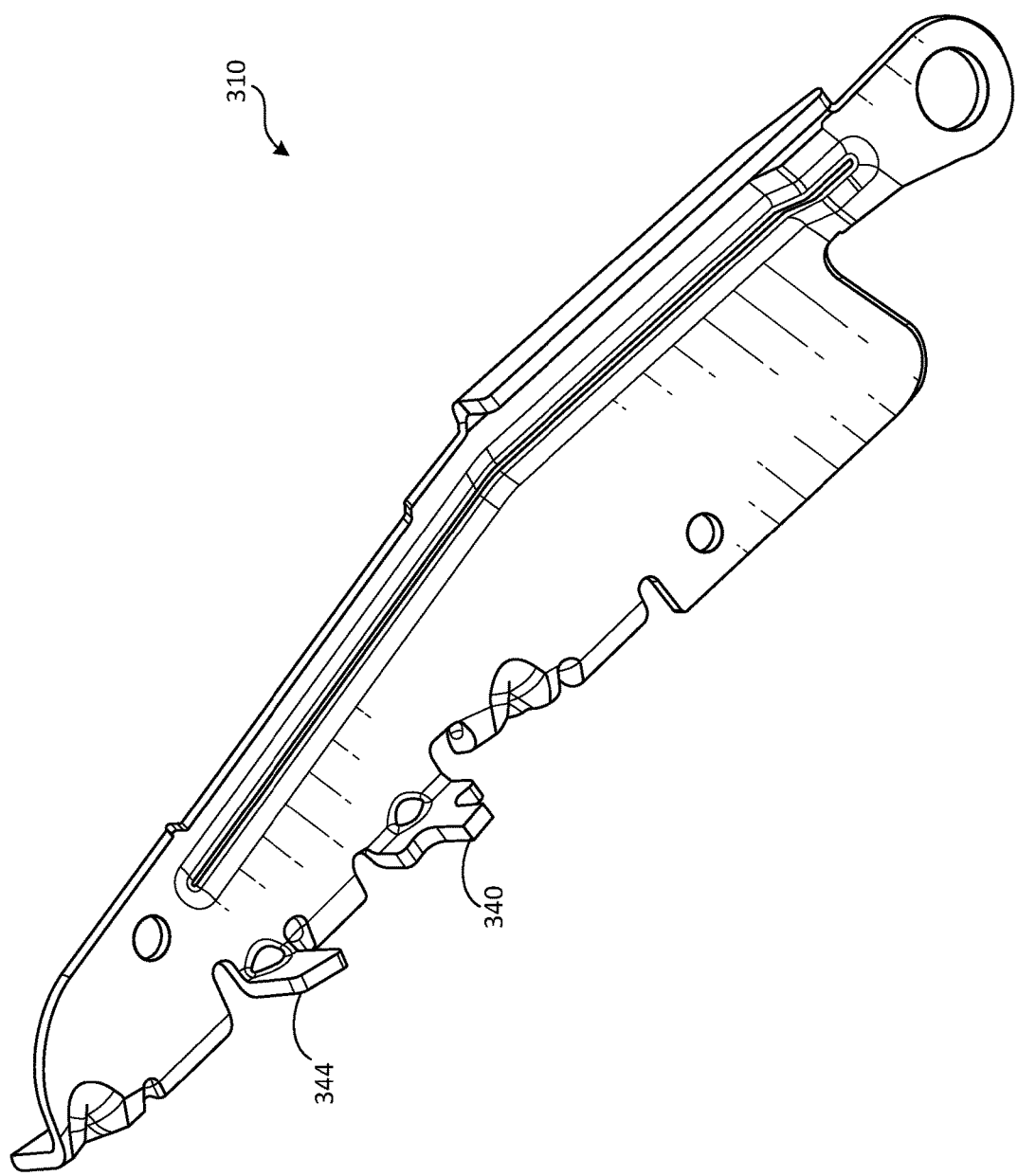

SUNROOF DRIVE APPARATUS AND RELATED SUNROOF ASSEMBLIES FOR USE WITH VEHICLES

FIELD OF THE DISCLOSURE

This disclosure relates generally to vehicles and, more particularly, to sunroof drive apparatus and related sunroof assemblies for use with vehicles.

BACKGROUND

Motor vehicles typically employ sunroofs to improve comfort of vehicle occupants by allowing sunlight to enter a vehicle cabin through a sunroof panel (e.g., glass). Some vehicle sunroofs are configured to open and close, which may be desirable to the vehicle occupants (e.g., when the vehicle cabin is relatively hot). For example, a known vehicle sunroof may have a panel that can be moved (e.g., tilted, raised, lowered, etc.) in response to a sunroof motor generating output.

SUMMARY

An aspect of the present disclosure includes an assembly for a sunroof of a vehicle. The assembly includes a sunroof panel and a rail extending in a length direction of the vehicle. The rail includes multiple guide channels to receive and guide movable sunroof components. The assembly also includes a guide block attached to a part of the rail between a first end of the rail and second end of the rail opposite to the first end and a bracket beneath the sunroof panel and supporting the sunroof panel. The bracket includes a first end and a second end opposite to the first end that is a pivot point of the bracket. The bracket is configured to pivot about the pivot point relative to the rail to change a state of the sunroof. The assembly also includes a link in the rail removably connected to the guide block. A first end of the link is pivotably coupled to a part of the bracket between the first and second ends of the bracket. The link includes a first pin positioned at an intermediate portion of the link and a second pin, spaced from the first pin, positioned at a second end of the link opposite to the first end. The assembly also includes a drive shoe in the rail slidably coupled to the link. A first slot extending through the drive shoe is configured to receive the first pin and guide the first pin through a part of the drive shoe to control an angular motion parameter of the link. A second slot extending through the drive shoe is configured to receive the second pin and guide the second pin through a different part of the drive shoe to provide and maintain a rotation axis of the link. Movement of the drive shoe relative to the link rotates the link about the rotation axis from a first orientation in which the link is inseparable from the guide block to a target orientation in which the link is separable from the guide block. A locking area at an end of the first slot can receive and hold the first pin during sunroof operation. When the first pin enters the locking area, the drive shoe is configured to impart one or more loads on the first pin that urge the link into the target orientation and enable the link and the bracket to slide along the rail together with the drive shoe in the length direction of the vehicle.

The foregoing paragraph has been provided by way of general introduction, and is not intended to limit the scope of the following claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 3A, 3B, 3C, 3D, and 3E are detailed views of an example assembly for a sunroof of a vehicle in accordance with the teachings of this disclosure;

FIGS. 4A, 4B, and 4C are detailed views of an example drive shoe and show different stages of a sunroof opening operation;

FIGS. 8A, 8B, 8C, 8D, and 8E are other detailed views of the example link of FIG. 7 and show additional implementations thereof;

The figures are not to scale. In general, the same reference numbers will be used throughout the drawing(s) and accompanying written description to refer to the same or like parts.

DETAILED DESCRIPTION

Figure 1:
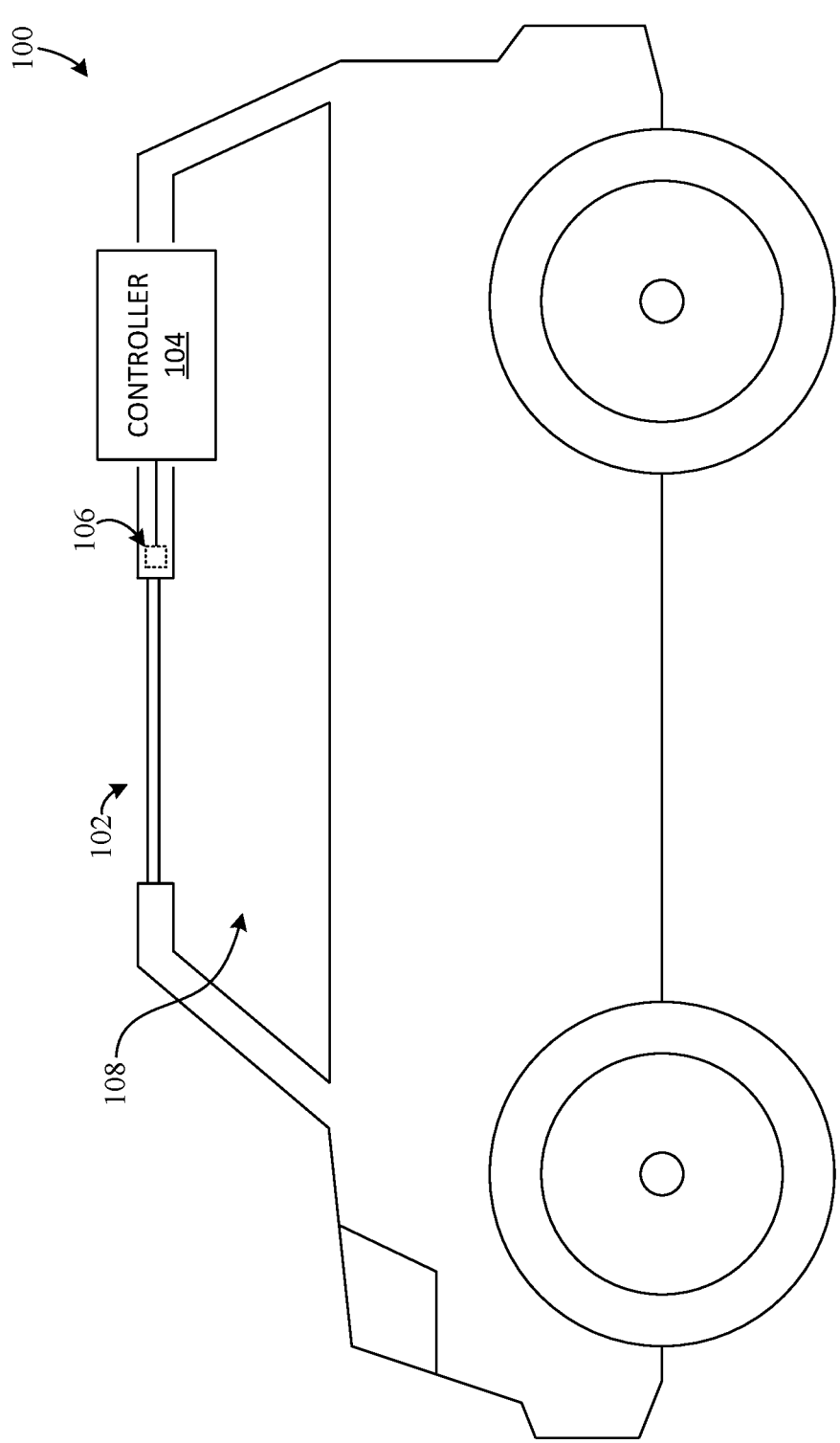
FIG. 1 is a view of an example vehicle in which examples disclosed herein can be implemented.

Some vehicle sunroofs have known single link systems that are structured to control movement of a glass panel based on motor output. For example, a known single link system can include a main bracket arranged along a side of the glass panel of a sunroof and fixedly coupled to the glass panel. Additionally, the known system can be provided with a motor-driven drive mechanism that is slidably coupled to a sunroof rail extending along a roof a vehicle. The known drive mechanism can include a known slidable shoe and a known rotatable link operatively coupled to the slidable shoe and the main bracket holding the panel, where interaction of the shoe and the link rotates the link and the bracket to open or close the sunroof. That is, the known link acts as lever to lift an end of the glass panel. As such, during sunroof operation, relatively high forces can be applied to the link, the shoe, and associated connecting parts. Further, in certain scenarios (e.g., when driving at high speeds), suction forces acting on the glass panel can create additional, excessive forces that are applied to such known components of the drive mechanism. As a result, the known link can be subject to substantial twisting due to uneven force distribution in its interaction with the rail and shoe during opening and closing operations, which creates binding and reduces efficiency in the system. Additionally, such a known link has a relatively long lever arm through which the forces are transmitted. The length of the arm of the known link can further contribute to such undesired twisting as well as create a potential for damage to the system. For example, relatively high stress concentrations may exists in areas of the link where pins are coupled to the link, and mechanical failure of the link can occur in these areas under high loading conditions.

The known link may be provided with two pins that slide along slots extending through the shoe to change the orientation of the link. Due to the inherent structure of the known link, an area behind at least one of the pins is not sufficiently supported, which allows the above mentioned twisting to occur under high loading conditions and/or rattling noises to be heard during vibration. Additionally, such a known system may also be provided with a known guide block attached to the rail that interacts with the link. In particular, the known guide block can be configured to substantially maintain a position of the link relative to the shoe, while allowing the link to rotate about one of the pins until the shoe reaches a final position relative to the link in which the shoe can drag or pull the link horizontally across the rail. Accordingly, the known link can also be provided with two different pins that slide along slots extending through the guide block to temporarily prevent separation of the guide block and the link. However, the known guide block may fail to sufficiently hold at least one of the pins when the sunroof in is in a vented state, which can lead to unwanted noise. That is, when the sunroof is in the vented state, the pin substantially floats in a portion of the slot due to a size and/or shape of the pin and the slot, where the pin may partially or fully slip out of the guide block during the closing operation and/or when relatively high loads are present in the system. Typically, to support this area during the closing operation, a supplemental anti-rotation feature is provided on the link configured to slide against part of the shoe. However, after an initial stage of the closing operation is carried out, such an anti-rotation feature on the link is ineffective.

Additionally, during the opening and closing operations, motion of the glass panel provided by these known drive mechanisms is substantially inefficient and has a non-continuous appearance. This is due to an extra step needed to lower the link into a locking position relative to the shoe. In particular, the known link reaches its highest rotation angle when the sunroof is in the vented state prior to the shoe reaching the final position relative to the link. As the shoe moves to the final position relative to the link, the rotation angle of the link slightly decreases such that the end of the glass panel moves downward.

Sunroof drive apparatus and related sunroof assemblies for use with vehicles are disclosed. Examples disclosed herein provide a light-weight and cost-effective solution to advantageously control motion of a panel (e.g., glass) of a sunroof. Some disclosed examples provide an assembly (e.g., a single link assembly) for the sunroof that includes an exemplary bracket (e.g., a function bracket) and an exemplary drive mechanism having improved performance characteristics. The bracket may be arranged alongside the panel and configured to carry and/or support the panel. The disclosed drive mechanism is operatively coupled to the bracket and configured to adjust the bracket between different positions based on a motor output applied to the drive mechanism, which opens or closes the sunroof. For example, the bracket can be adjusted by the drive mechanism between any of a lowered position, a tilted position, a raised position, and the like. The disclosed drive mechanism includes an example link that is pivotably coupled to a part of the bracket between a first end (e.g., rear end) of the bracket and a second end (e.g., a front end that is a pivot point of the bracket) of the bracket opposite to the first end. The drive mechanism also includes an example drive shoe slidably coupled to the link via a pin and slot connection. Each of the link and the drive shoe is positioned in a track or rail of the sunroof assembly and can move along a guide channel extending through the rail to receive guidance from the rail during sunroof operation. Additionally, the drive shoe may be connected to at least one motor (e.g., an electric motor of a sunroof), where output of the motor enables the drive shoe to slide along the rail.

Generally speaking, the disclosed drive mechanism is changeable and/or configured to change between a first state (e.g., a sliding state) in which the drive shoe is movable relative to the link and a second state (e.g., a dragging state) in which the drive shoe and the link are temporarily locked together. When the drive mechanism is in the first state, the drive shoe can slide against first and second pins (e.g., front and rear pins) on the link to adjust a relative orientation of the link in a controlled manner. In particular, movement of the drive shoe relative to the link changes the relative orientation of the link and, as a result, changes a relative orientation of the bracket (and the panel held by the bracket), such that the first end of the bracket moves up or down. On the other hand, when the drive mechanism is in the second state, the relative orientation of the link and a position of the link relative to the drive shoe are substantially fixed, where the drive shoe can drag or pull the link and the bracket along the rail in a length direction of the vehicle.

To facilitate controlling the orientation of the link, and the disclosed drive shoe can be provided with slots for guiding movement of the pins. For example, a first slot extending through the drive shoe can be configured to receive the first pin on the link and guide the first pin through a part of the drive shoe to control an angular motion parameter (e.g., any of an angular position, an angular velocity, and the like) of the link. Further, a second, separate slot extending through the drive shoe can be configured to receive the second pin on the link and guide the second pin through a different part of the drive shoe to provide and maintain a rotation axis of the link. The first slot may define a non-linear path along which the first pin can travel, while the second slot may define a linear path along which the second pin can travel. In particular, as the first and second pins travel across the respective paths, the drive shoe urges the link to rotate about the rotation axis (i.e., about the second pin) between any of a first orientation of the link in which the first end of the bracket is fully lowered, a second or intermediate orientation of the link in which the first end of the bracket is partially raised, and/or a third or target orientation in which the first end of the bracket is fully raised.

More particularly, the disclosed drive shoe is provided with an example locking area positioned at an end of the first slot to interact with the first pin, which facilitates transitioning the drive mechanism from the first state to the second state as well as maintaining the drive mechanism in the second state to allow horizontal translation of the system along the rail. As will be discussed in greater detail below, the disclosed drive mechanism utilizes an updated drive shoe path in which a position of the disclosed locking area allows for a higher rotation angle of the link compared to the above-mentioned known mechanism(s). This also allows for a shorter link with an exemplary pin layout that reduces stress concentrations in the link and more evenly distributes the loads on the pins during sunroof operation. Additionally, some examples disclosed herein provide exemplary features on an overmolded portion of the link to reduce a certain amount of cross-car rotation without impeding the functionality of the mechanism. As a result, examples disclosed herein increase system efficiency as well as reduce and/or eliminate binding associated with the above-mentioned known mechanism(s). The disclosed drive shoe path also allows for a more continuous motion of the panel when opening or closing the sunroof (e.g., see FIG. 11), where the link rotates about the rotation axis in a single rotational direction (e.g., clockwise or counterclockwise) from the first orientation to the target orientation.

The disclosed drive mechanism may transition from the first state to the second state in response to the first pin entering the locking area of the drive shoe during a sunroof opening operation. For example, as the first pin enters the locking area, the drive shoe is configured to impart a certain load on the first pin that urges the link into the target orientation. Further, the drive shoe is configured to engage and/or directly contact front and rear portions of the first pin while the first pin is in the locking area, which allows the drive shoe to effectively drag or pull the link and the bracket horizontally along the rail.

Additionally, to facilitate transitioning the drive mechanism back to the first state as well as maintaining the drive mechanism in the first state, the assembly can be provided with an example guide block attached to a part of the rail between a first end of the rail and a second end of the rail opposite to the first end. The disclosed guide block can removably connect to the link via a pin and slot connection. While connected together, the guide block is structured to prevent the link and the bracket from translating along the rail until the target orientation of the link is achieved. For example, the third and fourth pins on the link can slide against the guide block to substantially maintain the position of the link relative to the drive shoe, while allowing for changes in the relative orientation of the link. In particular, when the target orientation of the link is achieved, the link and the guide block can separate from each other, where the third and fourth pins exit the guide block and enter the rail to receive support from the rail.

Some examples disclosed herein utilize one or more updated guide block paths in which the engagement of the guide block and the third and fourth pins is maintained during rotation of the link. In such examples, each of the third and fourth pins remains substantially engaged with internal surface(s) of the guide block at all orientations of the link, where the guide block sufficiently holds each of the third and fourth pins until the third and fourth pins exit the guide block and enter the rail in a controlled manner, as will be discussed further below. As a result, the third and fourth pins are prevented from slipping out of the guide block under high loading conditions, and related noise is substantially reduced and/or eliminated. Additionally, the above-mentioned supplemental anti-rotation feature can be removed from the system to reduce costs and/or save space.

FIG. 1 is a view of an example vehicle (e.g., a motor vehicle) 100 in which examples disclosed herein can be implemented. The vehicle 100 of FIG. 1 could be, for example, any of a car, a van, a truck, a sport utility vehicle (SUV), and like, or any other suitable motor vehicle. According to the illustrated example of FIG. 1, the vehicle 100 includes an example sunroof 102, an example controller 104, and one or more example motors 106. The controller of FIG. 1 is structured and/or configured to control the motor(s) 106 to change a state of the sunroof 102, for example, from a first state (e.g., a closed state) to a second state (e.g., an open state) or vice versa. In some examples, the controller 104 of FIG. 1 receives a user input from an input device (e.g., an in-vehicle button or switch accessible to an occupant in the vehicle 100) connected to the controller 104 and, in response, opens or closes the sunroof 102 via the motor(s) 106 and based on the user input.

The controller 104 of FIG. 1 can be implemented, for example, using one or more microcontrollers, one or more electronic control units (ECUs), and the like, any other suitable control circuitry, or a combination thereof. As such, the controller 104 may include at least one processor and a database in communication with the processor. The controller 104 is sometimes referred to as a sunroof controller and/or a vehicle controller. Additionally, the controller 104 is communicatively coupled to the motor(s) 106, for example, via a transmission or signal wire, a bus, radio frequency, etc. In some examples, the controller 104 provides electrical power and/or one or more control signals or commands to the motor(s) 106, thereby controlling the motor(s) 106 and/or an output thereof (e.g., a torque and/or a force). In other examples, the controller 104 receives (e.g., continuously and/or repeatedly) data from the motor(s) 106, such as positional data that may be indicative of a panel position and/or the state of the sunroof 102.

The controller 104 of FIG. 1 may also be communicatively coupled to an input device, which facilitates interactions between the controller 104 and a person or user. The input device may be positioned in the vehicle 100 such that a vehicle occupant can activate and/or provided an input to the input device. In some examples, the controller 104 receives input data from the input device corresponding to a certain sunroof state or panel position. In response to receiving the input data, the controller 104 processes the input data and/or directs the motor(s) 106 in accordance with the input data.

The sunroof 102 of FIG. 1 can be implemented, for example, using any of a panoramic sunroof, a pop-up sunroof, a sliding sunroof, a spoiler sunroof, and the like, or any other suitable vehicle sunroof. The sunroof 102 is sometimes referred to as a vehicle sunroof. In some examples, the sunroof 102 is structured and/or configured to open, close, vent, and/or change between different sunroof states, for examples, in response to the motor(s) 106 generating output. As such, the sunroof 102 may be provided with at least one movable panel (e.g., a glass panel) that can be tilted, raised, lowered, and the like. In such examples, when closed or in the first state, the sunroof 102 of FIG. 1 substantially isolates a cabin 108 of the vehicle 100 from an outside or external environment, such that external fluids (e.g., water, air, etc.) are prevented from flowing into the cabin 108 through the sunroof 102. Of course, light (e.g., sunlight) may be transmitted through the panel(s) of the sunroof 102 when the sunroof 102 is closed or in the first state. On the other hand, when open or in the second state, the sunroof 102 exposes the vehicle cabin 108 to the external environment, such that ambient air is permitted or enabled to flow into the vehicle cabin 108, which may be desired by a driver and/or vehicle occupant(s) in certain driving conditions.

The motor(s) 106 of FIG. 1 can be implemented, for example, using one or more electric motors. The motor(s) 106 are coupled to the sunroof 102 and/or supported by a sunroof component. Further, the motor(s) 106 may be communicatively coupled to the controller 104. In some examples, in response to receiving the power and/or the control signal(s) or command(s) from the controller 104, the motor(s) 106 cause the sunroof 102 to open, close, and/or change between the different sunroof states.

Figure 2A:
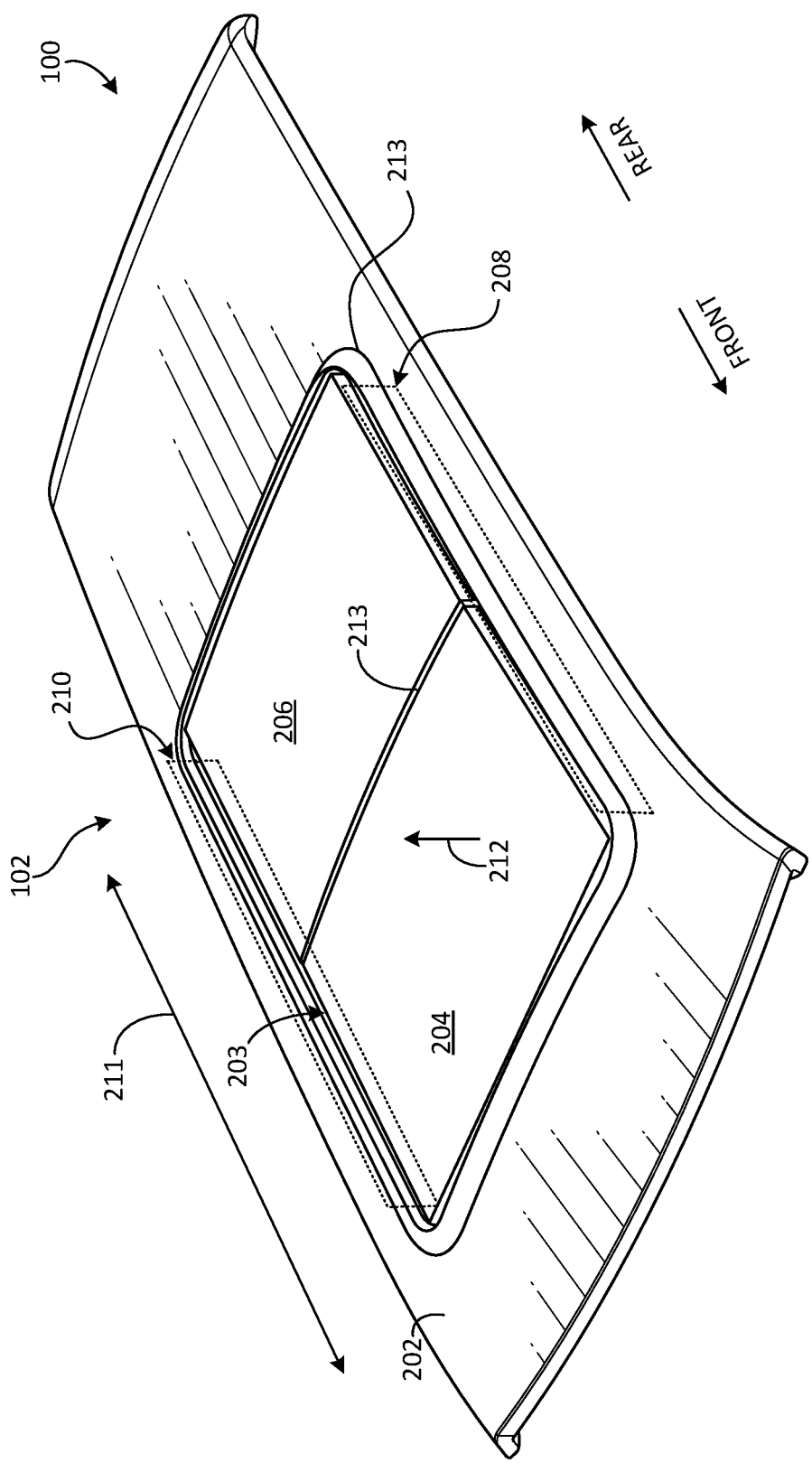
FIG. 2A is a partial-view of the example vehicle of FIG. 1 and shows an example vehicle sunroof in a first state.

FIG. 2A is a partial-view of the vehicle 100 and shows the sunroof 102 in the first state. The sunroof 102 of FIG. 2A is coupled to a roof 202 of the vehicle 100, for example, via one or more example fasteners and/or one or more example fastening methods or techniques. Further, the sunroof 102 of FIG. 2A or at least part thereof is disposed in an aperture 203 extending through the roof 202. The aperture 203 can be, for example, a relatively large opening in the roof 202 that is sized and/or shaped to receive one or more sunroof components. The sunroof 102 may be provided with one or more example panels (e.g., glass panels) 204, 206, two of which are shown in this example (i.e., a first panel 204 and a second panel 206). In FIG. 2A, the first panel 204 is movable and/or is configured to move between a first panel position (as shown in FIG. 2A) and a second panel position different from the first panel position, which changes the state of the sunroof 102. The first panel position can be, for example, a lowered position of the first panel 204 corresponding to the first state of the sunroof 102. On the other hand, the second panel position can be, for example, a tilted position or a raised position of the first panel 204 corresponding to the second state of the sunroof 102. In some examples, the first panel 204 can slide over or under the second panel 206 to open the sunroof 102 (e.g., see FIG. 2B). Additionally or alternatively, in some examples, the second panel 206 of FIG. 2A is likewise movable and/or configured to move between the first panel position and the second panel position.

As previously mentioned, the sunroof 102 of FIG. 2A is in the first state. As such, the first panel 204 of FIG. 2A is in the first panel position, and/or the second panel 206 of FIG. 2A is in the first panel position. To facilitate translating the panel(s) 204, 206 and/or controlling positions thereof, the sunroof 102 is provided with one or more exemplary assemblies 208, 210, two of which are shown. For example, in FIG. 2A, a first assembly (e.g., a single link assembly) 208 is associated with translating a first side of the first panel 204, while a second assembly (e.g., a single link assembly) 210 is associated with translating a second side of the first panel 204 opposite to the first side. As will be discussed in greater detail below, each of the assemblies 208, 210 include one or more particular sunroof components that function cooperatively to adjust a position and/or an orientation of the first panel 204 based on motor output. Such component(s) include, but are not limited to, any of an adjustable bracket, a catch device for the adjustable bracket, a slidable shoe, a rotatable link, a guide block, a guide track or rail, a cable, and the like, any other suitable component(s) associated with sunroof operation, or a combination thereof. For example, an adjustable bracket (e.g., the example bracket 302 described below) may be arranged along a side of the first panel 204 and coupled to the side, where the adjustable bracket provides support to and/or holds the first panel 204 or at least the side thereof. In another example, a sunroof track or rail (e.g., the example rail 304 described below) may extend in a length direction of the vehicle 100 across a certain dimension (e.g., a length) 211 of the sunroof 102 or at least part of the dimension 211, which provides one or more paths or guideways along which movable sunroof components can travel.

In some examples, when the motor(s) 106 generate output, the first and second assemblies 208, 210, together, advantageously guide the first panel 204 of FIG. 2A between the first and second panel positions. Additionally, when the motor(s) 106 cease generating the output, the first and second assemblies 208, 210, together, can effectively hold the first panel 204 in one of the first panel position, the second panel position, or a different panel position, where the first panel 204 is substantially immobile (e.g., until subsequent motor output is generated). In such examples, each assembly 208, 210 or at least part thereof is connected to the motor(s) 106 to receive the output therefrom, for example, via one or more cables, belts, chains, etc. that extend from the motor(s) 106 to a movable component of the assembly 208, 210.

Additionally, the first assembly 208 and/or the second assembly 210 can be advantageously utilized to secure the first panel 204 in the presence of relatively high panel forces associated with causing panel or bracket deflection. In certain driving scenarios, one or more external forces (e.g., any of suction forces, impact forces, etc.) 212 may be applied to the first panel 204 while the sunroof 102 is closed or in the first state, which urges the first panel 204 to move and/or deflect along with the sunroof component(s) connected to the first panel 204. Such force(s) 212 can be generated, for example, as a result of the vehicle 100 driving at relatively high speeds and/or during a vehicle rollover event. In some examples, to protect weatherstrips 213 and/or other fluid seals or sealing devices of the sunroof 102, the first and second assemblies 208, 210, together, are structured to counteract the external force(s) 212, such that the panel or bracket deflection is substantially reduced and/or eliminated while the sunroof 102 is in the first state.

Figure 2B:
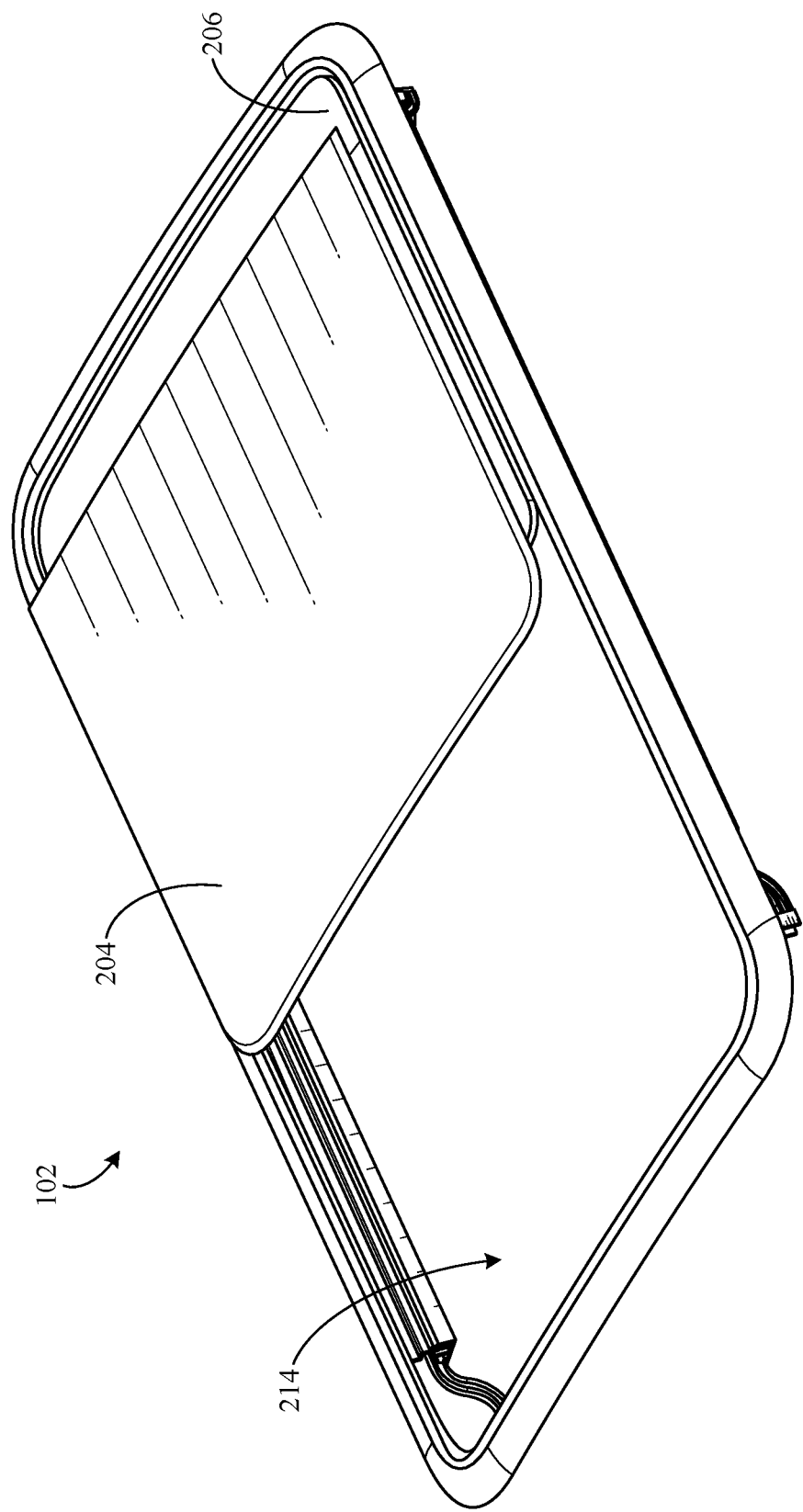
FIG. 2B is a view of the example vehicle sunroof of FIG. 2A and shows a different state of the example vehicle sunroof.

FIG. 2B is a view of the vehicle sunroof 102 of FIG. 2A and shows the second state of the vehicle sunroof 102. In contrast to the illustrated example of FIG. 2A, the first panel 204 of FIG. 2B is in the second panel position or a fully raised position. In particular, the vehicle sunroof 102 of FIG. 2B substantially exposes the vehicle cabin 108 to an outside environment. For example, the fluid(s) may pass into the vehicle cabin 108 through an example opening 214 in the sunroof 102 resulting from the first panel 204 moving away from the first panel position. While FIG. 2B depicts the first and second panels 204, 206 overlapping and being substantially parallel relative to each other when the first panel 204 is in the second panel position, in some examples, the second panel position can correspond to a different or intermediate state (e.g., a vented state) of the sunroof 102, wherein the first panel 204 is adjacent and substantially tilted relative to the second panel 206.

Although FIGS. 2A and 2B depict aspects in connection with translating the first panel 204, in some examples, such aspects likewise apply to the second panel 206. For example, the second panel 206 can be similarly configured to move to provide an opening in the sunroof 102. In such examples, the first and second assemblies 208, 210 may be operatively coupled to the second panel 206. Alternatively, the sunroof 102 may be provided with one or more additional assemblies, different from the first and second assemblies 208, 210, that is/are operatively coupled to the second panel 206 to likewise guide and/or control movement thereof.

FIGS. 3A, 3B, 3C, 3E, and 3D are detailed views of an example assembly 300 for a sunroof of a vehicle in accordance with the teachings of this disclosure. In some examples, the assembly 300 of FIGS. 3A, 3B, 3C, 3E, and 3D corresponds to and/or can be used to implement one or more of the assemblies previously described such as, for example, the first assembly 208 and/or the second assembly 210. According to the illustrated examples of FIGS. 3A, 3B, and 3C, the assembly 300, when assembled, forms and/or defines the sunroof 102 or at least part thereof. The assembly 300 shown is sometimes referred to as a vehicle sunroof assembly and/or a sunroof assembly.

Turning to FIG. 3A, an exploded top-view of the assembly 300 is shown. The assembly 300 of FIG. 3A includes an example bracket (e.g., a function bracket of a sunroof) 302 supporting and/or configured to hold a sunroof panel, such as the first or second panel 204, 206. For example, the bracket 302 can be arranged along a side of the sunroof panel 204, 206 and fixedly coupled to the sunroof panel 204, 206, for example, via one or more fasteners and/or fastening methods or techniques. The bracket 302 of FIG. 3A is adjustable and sometimes referred to as an adjustable bracket. Accordingly, the bracket 302 can be adjusted between different positions and/or orientations, for example, by applying certain forces to the bracket 302 in a substantially controlled manner, which changes the position of the sunroof panel 204, 206 and/or changes the state of the sunroof 102.

To facilitate providing support and/or guidance to the bracket 302 and related component(s), the assembly 300 of FIG. 3A includes an example track or rail 304, as represented by the dotted/dashed lines of FIG. 3A. The rail 304 of FIG. 3A is positionable on the roof 202 of the vehicle 100 and/or can be fixedly coupled to the roof 202, for example, via one or more fasteners and/or one or more fastening methods or techniques. When installed on the roof 202, the rail 304 extends in the length direction of the vehicle 100. In particular, the rail 304 of FIG. 3A forms and/or defines at least one guideway extending across a length of the rail 304 or part thereof to receive and guide one or more movable sunroof components, as discussed in greater detail below.

According to the illustrated example of FIG. 3A, the assembly 300 can be provided with an example drive mechanism (e.g., a motor-driven drive mechanism) 306 that is slidably coupled to the rail 304, which facilitates tilting, raising, lowering, and/or otherwise translating the bracket 302 and the panel held by the bracket 302. In FIG. 3A, the drive mechanism 306 is provided with an example drive shoe 308 and an example link (e.g., a link bracket) 310 that is operatively connected to the drive shoe 308 and the bracket 302. The link 310 is pivotably coupled to the bracket 302, for example, via a first movable joint (e.g., a pin joint) 312 formed and/or defined by the link 310 and the bracket 302. As such, the link 310 and the bracket 302 can pivot or rotate relative to each other about the first movable joint 312 or a first axis 314 associated with the first joint 312. Additionally, the drive shoe 308 is configured to slidably couple to the link 310, for example, via a pin and slot connection or interface formed and/or defined by the drive shoe 308 and the link 310. The drive shoe 308 and/or, more generally, the drive mechanism 306 of FIG. 3A may be driven by at least one of the motor(s) 106.

The drive mechanism 306 of FIG. 3A, when assembled, is changeable and/or configured to change between different states such as, for example, a first state (e.g., a sliding state) of the drive mechanism 306 and a second state (e.g., a dragging state) of the drive mechanism 306 different from the first state. When the drive mechanism 306 is in the first state, the drive shoe 308 is movable relative to the link 310, where the drive shoe 308 can slide against one or more pins on the link 310 to adjust a relative orientation of the link 310 in a controlled manner. As will be discussed in greater detail below, movement of the drive shoe 308 relative to the link 310 changes the relative orientation of the link 310 and, as a result, changes a relative orientation of the bracket 302 and the panel held by the bracket 302. In some examples, the drive shoe 308 can be moved (e.g., via the motor(s) 106) along the rail 304 relative to the link 310 in a first direction (e.g., a rear or rearward direction) 316 and/or a second direction (e.g., a front or forward direction) 318 opposite to the first direction 316. On the other hand, when the drive mechanism 306 is in the second state, the relative orientation of the link 310 and a position of the link 310 relative to the drive shoe 308 are substantially fixed, where the drive shoe 308 can drag or pull the link 310 and the bracket 302 across the rail 304 in the length direction of the vehicle 100. That is, the link 310 and the drive shoe 308 substantially lock together when the drive mechanism 306 is in the second state. In such examples, the drive shoe 308, the link 310, and the bracket 302 can move cooperatively together or in tandem in the first or second direction 316, 318 based on the output of the motor(s) 106. Each of the drive shoe 308 and the link 310 can be disposed in a guide channel or slot of the rail 304 and/or configured to slide through the rail 304 to receive guidance from the rail 304 during sunroof operation (e.g., see FIG. 10).

Figure 3D:
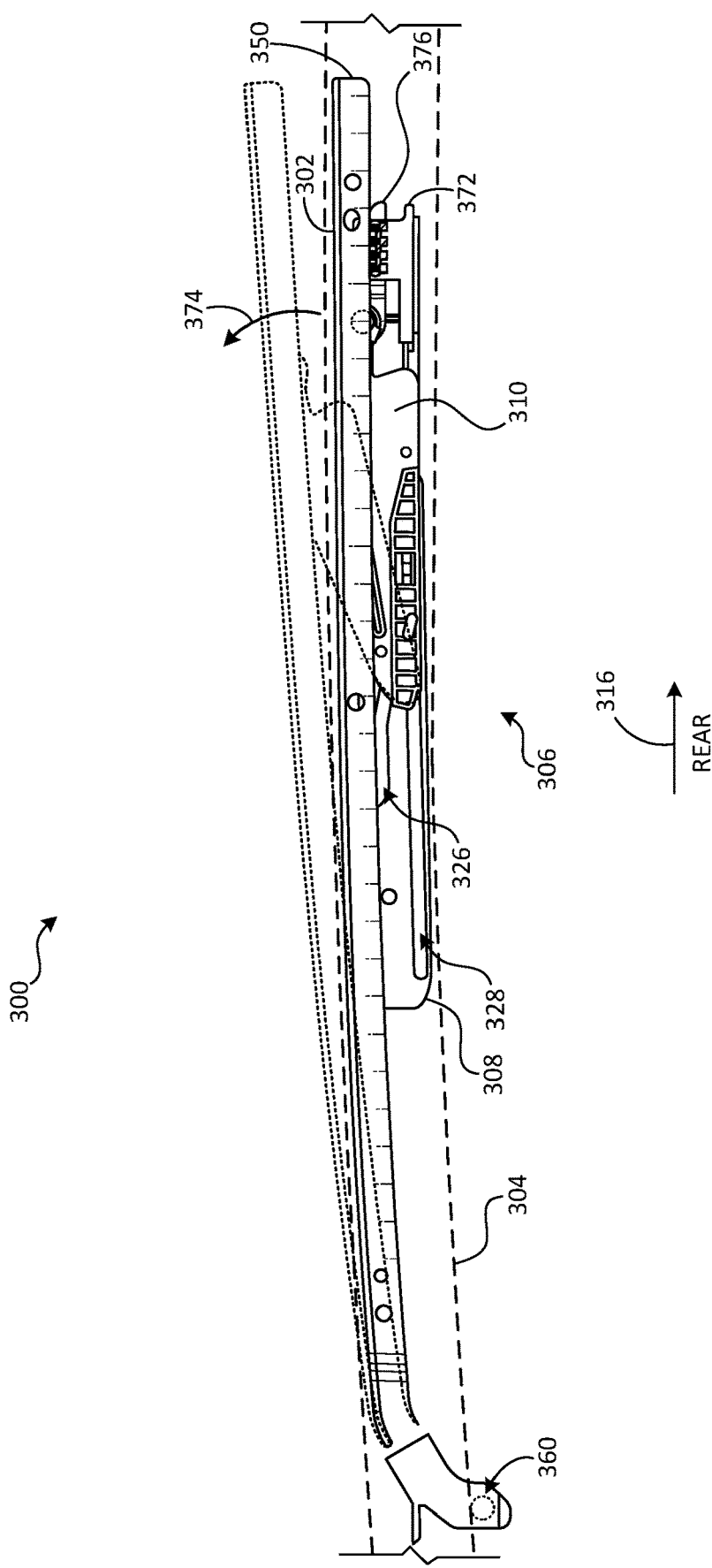

In some examples, to facilitate precisely controlling link movement, the link 310 is provided with one or more pins associated with the drive shoe 308, two of which are shown in this example. In FIG. 3A, a first pin (e.g., a rear pin) 320 coupled to the link 310 projects from a first side 322 of the link 310, which is insertable in the drive shoe 308. Additionally, a second pin (e.g., a front pin) 324 coupled to the link 310 projects from the first side 322 of the link 310, which is similarly insertable in the drive shoe 308. In such examples, the drive shoe 308 is configured to receive the pin(s) 320, 324 in one or more respective slots extending through the drive shoe 308 to guide movement of the pin(s) 320, 324 during sunroof operation. For example, the first pin 320 can slide through a first slot 326 (shown in FIG. 3D) in the drive shoe 308, while the second pin 324 can slide through a second slot 328 (shown in FIG. 3D) in the drive shoe 308 different from the first slot 326. In particular, the second pin 324 of FIG. 3A is a pivot point of the link 310, wherein a second axis (e.g., a rotation axis) 329 of the link 310 about which the link 310 can rotate is provided by engagement of the second pin 324 and one or more internal surfaces of the drive shoe 308.

To enable operation of the drive mechanism 306, the drive shoe 308 can be connected to at least one of the motor(s) 106, for example, via a cable, a belt, and the like, and/or any other suitable component(s) capable of transmitting energy from the motor(s) 106 to the drive shoe 308. In some examples, the drive shoe 308 is connected to the motor(s) 106 via a cable 330 (and the like) extending from the drive shoe 308 to the motor(s) 106, where tension in the cable 330 is utilized to pull the drive shoe 308 along the rail 304. In such examples, a first example receiver (e.g., a cable receiver) 332 attached to the drive shoe 308 can be coupled to the cable 330. Accordingly, energy is transmittable through the cable 330 of FIG. 3A from the motor(s) 106 to the drive shoe 308. In some examples, output of the motor(s) 106 creates tension in the cable 330, thereby moving the drive shoe 308 in the first direction 316 and/or the second direction 318.

Additionally, to facilitate transitioning the drive mechanism 306 between the first and second states and/or maintaining the drive mechanism 306 in the first state, the assembly 300 can be provided with an example first guide block 334. The first guide block 334 of FIG. 3A is attached to a part of the rail 304 that is between a first end (e.g., a rear end) 336 of the rail 304 and a second end (e.g., a front end) 338 of the rail 304 opposite to the first end 336. The first guide block 334 may be fixedly coupled to the rail 304, for example, via one or more fasteners and/or one or more fastening methods or techniques.

In some examples, the first guide block 334 can receive the link 310 and removably connect to the link 310, for example, via a pin and slot connection or interface that is formed and/or defined by the first guide block 334 and the link 310. In such examples, the link 310 is configured to connect the first guide block 334 and disconnect from the first guide block 334 based on an orientation of the link 310 relative to the first guide block 334. In particular, when connected together, the first guide block 334 is structured to prevent the link 310 and the bracket 302 from translating along the rail 304 in the first direction 316 until a certain or target orientation of the link 310 is achieved (e.g., see FIG. 3E). As will be discussed further below, one or more pins on the link 310 can slide against the guide block 334 to substantially maintain the position of the link 310 relative to the drive shoe 308, while allowing for changes in the relative orientation of the link 310. When the target orientation of the link 310 is achieved, the link 310 and the first guide block 334 can separate from each other as the drive shoe 308 pulls the link 310 and the bracket 302 in the first direction 316 to fully open the sunroof 102.

The link 310 of FIG. 3A may be provided with one or more pins associated with the first guide block 334, two of which are shown in this example. In some examples, a third pin 340 coupled to the link 310 projects from a second side 342 of the link 310, which is insertable in the first guide block 334. Additionally, a fourth pin 344 coupled to the link 310 projects from the second side 342 of the link 310, which is similarly insertable in the first guide block 334. The second side 342 of the link 310 is opposite to the first side 322 of the link 310. As such, the third and fourth pins 340, 344 of FIG. 3A are positioned on the link 310 opposite relative to the first and second pins 320, 324. In such examples, the first guide block 334 is configured to receive the pin(s) 340, 344 in one or more respective slots extending through the first guide block 334 to guide movement of the pin(s) 340, 344 during sunroof operation. For example, the third pin 340 can slide through a third slot 346 (shown in FIG. 3B) in the first guide block 334 to provide support to the link 310 as the link 310 rotates relative to the drive shoe 308 and the first guide block 334, while the fourth pin 344 can slide through a fourth slot 348 (shown in FIG. 3B) in the first guide block 334 different from the third slot 346 to provide support to the link 310 as the link 310 rotates relative to the drive shoe 308 and the first guide block 334.

As previously mentioned, the bracket 302 may pivot relative to the link 310 about the first movable joint 312. As such, a point at which the bracket 302 and the drive mechanism 306 connect is a first pivot point of the bracket 302. In FIG. 3A, a first end 349 of the link 310 is pivotably coupled to a part of the bracket 302 that is between a first end (e.g., a rear end) 350 of the bracket 302 and a second end (e.g., a front end) 352 of the bracket 302 opposite to the first end 350. Additionally, in some examples, the second end 352 of the bracket 302 is a second pivot point of the bracket 302 that is spaced from the first pivot point. For example, as the drive mechanism 306 actuates, the bracket 302 of FIG. 3A is configured to pivot about the second pivot point relative to the rail 304 to change the state of the sunroof 102. In such examples, the assembly 300 can also include a fifth pin 356 projecting from the second end 352 of the bracket 302 that is receivable by a second guide block (e.g., a front guide block) 358 (shown in FIG. 3C), different from the first guide block 334, that is coupled to the rail 304 at or adjacent the second end 338 of the rail 304. The fifth pin 356 of FIG. 3A is represented by the dotted/dashed lines of FIG. 3A. In particular, the fifth pin 356 of FIG. 3A is configured to slidably engage the second guide block 358, thereby providing a second movable joint (e.g., a pin joint) 360 for the bracket 302 different from the first movable joint 312. Additionally, the fifth pin 356 and the second guide block 358, together, can be configured to raise and/or lower the second end 352 of the bracket 302, as discussed further below.

Turning to FIG. 3B, a detailed view of the first guide block 334 is shown in which the first guide block 334 is attached to the rail 304. In particular, a cross-sectional area of the rail 304 along line A-A of FIG. 3A is shown in the illustrated example of FIG. 3B. In FIG. 3B, the first guide block 334 is slidably engaged with the link 310. More particularly, the link 310 is removably connected to the first guide block 334 via the third and fourth pins 340, 344. As previously described, the first guide block 334 can be provided with one or more slots for guiding movement of the pin(s) 340, 344 on the link 310, two of which are shown in this example (i.e., the third slot 346 and the fourth slot 348). In some examples, the first guide block 334 includes a body (e.g., a relatively small, block-shaped body) in which the third and fourth slots 346, 348 are positioned. In such examples, the third slot 346 extends through the body and is configured to receive the third pin 340, and the fourth slot 348 extends through the body and is configured to receive the fourth pin 344. In FIG. 3B, the third pin 340 is in the third slot 346 and abutting one or more internal surfaces of the first guide block 334 defining the third slot 346, while the fourth pin 344 of FIG. 3B is in the fourth slot 348 and abutting one or more internal surfaces of the first guide block 334 defining the forth slot 348.

According to the illustrated example of FIG. 3B, as the relative orientation of the link 310 changes, the third and fourth pins 340, 344 slide through the respective third and fourth slots 346, 348 away from a bottommost (in the orientation of FIG. 3B) portion of the first guide block 334 toward a topmost (in the orientation of FIG. 3B) portion of the first guide block 334. In some examples, each of the third and fourth pins 340, 344 remain substantially engaged with the internal surface(s) of the first guide block 334 during such movement of the link 310, which reduces and/or eliminates unwanted noise typically associated with sunroof operation. Further, as the link 310 reaches the target orientation thereof, the third pin 340 enters a topmost section of the third slot 346, where the third pin 340 can exit the third slot 346 and enter a fifth slot 364 in the rail 304 in a controller manner. Similarly, the fourth pin 344 enters a topmost section of the fourth slot 348 as the link 310 reaches the target orientation thereof, where the fourth pin 344 can exit the fourth slot 348 and enter a sixth slot 366 in the rail 304 in a controller manner. As such, the rail 304 can be provided with at least two slots 364, 366 for further guiding movement of the respective third and fourth pins 340, 344 after the third and fourth pins 340, 344 exit the first guide block 334. The fifth slot 364 is adjacent the third slot 346 and/or connected to the third slot 346, such that the third pin 340 can easily pass between the third and fifth slots 346, 364. Similarly, the sixth slot 366 is adjacent the fourth slot 348 and/or connected to the fourth slot 348, such that the fourth pin 344 can easily pass between the fourth and sixth slots 348, 366.

Turning in detail to FIG. 3C, a detailed view of the second guide block 358 is shown in which the second guide block 358 is attached to the rail 304. In particular, a cross-sectional area of the rail 304 along line B-B of FIG. 3A is shown in the illustrated example of FIG. 3C. Generally speaking, the assembly 300 can include the second guide block 358 to facilitate raising and/or lowering the second end 352 of the bracket 302. In some examples, the second guide block 358 is fixedly coupled to the rail 304, for example, via one or more fasteners and/or one or more fastening methods or techniques. Further, the second guide block 358 of FIG. 3C is slidably engaged with the fifth pin 356 on the guide structure 358 to create the second movable joint 360 and/or the second pivot point about which the bracket 302 can pivot.

In FIG. 3C, the second guide block 358 is provided with at least one slot for guiding movement of the fifth pin 356. In some examples, a seventh slot 368 extending through the second guide block 358 can be configured to receive the fifth pin 356 and guide the fifth pin 356 through a part of the second guide block 358. In FIG. 3C, the fifth pin 356 is in the seventh slot 368 adjacent an end of the seventh slot 368 and abutting one or more internal surfaces of the second guide block 358 that define the seventh slot 368. In such examples, movement of the fifth pin 356 through the seventh slot 368 urges the second end 352 of the bracket 302 to move in an upward direction and/or a downward direction. Additionally, the rail 304 of FIG. 3C can be provided with at least one slot for further guiding movement of the fifth pin 356. For example, an eighth slot 370 extending through the rail 304 is configured to receive the fifth pin 356 after the fifth pin 356 exits the second guide block 358. The eighth slot 370 is adjacent the seventh slot 368 and/or connected to the seventh slot 368, such that the fifth pin 356 can easily pass between the seventh and eighth slots 368, 370.

In FIG. 3C, the seventh slot 368 is substantially curved and/or inclined, which facilitates controlling a height position of the fifth pin 356 as well as a height position of the second end 352 of the bracket 302. On the other hand, the eighth slot 370 is substantially linear, which facilitates maintaining the height position of the fifth pin 356 as well as the height position of the second end 352 of the bracket 302. In some examples, as the fifth pin 356 of FIG. 3C travels through the seventh slot 368 toward the eighth slot 370 in the rail 304, the internal surface(s) of the second guide block 358 impart a force or load on the fifth pin 356 having a vertical force component that urges the second end 352 of the bracket 302 to rise. As the fifth pin 356 continues traveling in the same direction, the fifth pin 356 exits the seventh slot 368 and enters the eighth slot 370, where the rail 304 slidably supports the fifth pin 356. While the fifth pin 356 is positioned in the eighth slot 370, the rail 304 imparts a force or load on the fifth pin 356 that substantially maintains the second end 352 of the bracket 302 in a raised positioned, while allowing the fifth pin 356 to slide horizontally along the rail 304.

Turning to FIG. 3D, a side-view of the assembly 300 is shown. In FIG. 3D, the bracket 302 is in a first position thereof (sometimes referred to as a first bracket position) such as for example, a lowered or closed position that provides the first state of the sunroof 102. In some examples, to effectively hold the bracket 302 in the first position thereof, the assembly 300 can be provided with an example catch device (e.g., a high speed catch device) 372 that can connect to the bracket 302 (or a part thereon) and disconnect from the bracket 302. In such examples, the catch device 372, when connected to the bracket 302 (as shown in FIG. 3D), is effective in reducing and/or eliminating undesired panel or bracket movement typically associated with high vehicle speeds and/or certain driving events (e.g., a vehicle rollover), where the external force(s) 212 may act on the panel held by bracket 302.

In FIG. 3D, the drive mechanism 306 is structured to adjust the bracket 302 between the first position and at least one additional position different from the first position when the output of the motor(s) 106 is applied to the drive mechanism 306, thereby at least partially opening the sunroof 102 of the vehicle 100. In some examples, the drive mechanism 306 and the motor(s) 106, together, move the bracket 302 to a second position such as, for example, a tilted position of the bracket 302, as represented by the dotted/dashed lines of FIG. 3D. Additionally or alternatively, in some examples, the drive mechanism 306 and the motor(s) 106, together, move the bracket 302 to a third position such as, for example, a fully raised position of the bracket 302 (e.g., see FIG. 3B). In particular, the first position of the bracket 302 is a position in which the vehicle sunroof 102 is closed, while the second or third position of the bracket 302 is a position in which the vehicle sunroof 102 is at least partially or fully open.

According to the illustrated example of FIG. 3D, the drive shoe 308 is slidably coupled to the link 310 via the first pin 320, the second pin 324, the first slot 326, and the second slot 328. Further, the drive mechanism 306 of FIG. 3D is in the first state thereof Accordingly, in FIG. 3D, the drive shoe 308 is movable relative to the link 310 based on motor output applied to the drive shoe 308, and the link 310 is rotatable about the second axis 329 relative to both the drive shoe 308 and the first guide block 334. In some examples, the drive shoe 308 can be moved relative to the link 310 in the first direction 316 during a sunroof opening operation associated with opening the sunroof 102. In particular, the drive shoe 308 of FIG. 3D can slide along the rail 304 from a first position (e.g., an initial drive shoe position) relative to the link 310 (as shown in FIG. 3D) to at least one additional position relative to the link 310 different from the first position, which causes the link 310 to rotate about the second axis 329 in a first rotational direction (e.g., counterclockwise) 374. For example, the motor(s) 106 can urge the drive shoe 308 to move to a second position relative to the link 310 such as, for example, an intermediate position (e.g., a vent position) providing the intermediate state of the sunroof 102 (e.g., see FIG. 4B). In such examples, the catch device 372 can also slide along the rail 304 in the first direction 316 in tandem with the drive shoe 308, where the catch device 372 disconnects from the bracket 302 to allow such rotation. Conversely, the drive shoe 308 of FIG. 3D can be moved relative to the link 310 in the second direction 318 during a sunroof closing operation associated with closing the sunroof 102. For example, the drive shoe 308 can slide along the rail 304 from the second position back to the first position, which causes the link 310 to rotate about the second axis 329 in a second rotational direction (counterclockwise) opposite to the first rotational direction 374. In any case, the drive shoe 308 of FIG. 3D remains substantially engaged with the link 310 (e.g., the drive shoe 308 and the link 310 do not disconnect or separate during sunroof operation). Each of the positions of the drive shoe 308 relative to the link 310 is sometimes referred to as a drive shoe position.

As previously described, the drive shoe 308 can be provided with the first and second slots 326, 328 for guiding movement of the first and second pins 320, 324 on the link 310. In FIG. 3D, each of the first and second slots 326, 328 extends through the drive shoe 308 and is configured to receive a respective one of the first and second pins 320, 324. In some examples, the first slot 326 of FIG. 3D is configured to guide the first pin 320 through a part of the drive shoe 308 to control an angular motion parameter (e.g., any of an angular position, an angular velocity, and the like) of the link 310, while the second slot 328 is configured to guide the second pin 324 through a different part of the drive shoe 308 to provide and maintain the rotation axis 329 of the link 310 during sunroof operation. In FIG. 3D, the link 310 is in a first orientation in which the link 310 is inseparable from the first guide block 334. In particular, the link 310 of FIG. 3D can rotate relative to the drive shoe 308 about the second axis 329 from the first orientation to at least one additional orientation different from the first orientation such as, for example, a second orientation providing the tilted position of the bracket 302, as substantially represented by the dotted/dashed lines of FIG. 3D. Accordingly, rotation of the link 310 in the first rotational direction 374 urges the bracket 302 to rotate in the first rotational direction 374 about the second joint 360 or a third axis associated therewith to raise the first end 350 of the bracket 302. Conversely, rotation of the link 310 in the second rotational direction urges the bracket 302 to rotate in the second rotational direction about the second joint 360 to lower the first end 350 of the bracket 302.

In some examples, to enable the bracket 302 to connect to and disconnect from the catch device 372, the vehicle sunroof assembly 300 includes an example adapter 376 positioned on and/or supported by the bracket 302. The adapter 376 of FIG. 3D can be fixedly coupled to the bracket 302, for example, via one or more fasteners and/or one or more fastening methods or techniques. In FIG. 3D, the adapter 376 is positioned proximate to the first end 350 of the bracket 302, which facilitates reducing loads applied to the catch device 372 by the adapter 376 during a catch operation in which the catch device 372 catches the adapter 376. As shown in FIG. 3D, the adapter 376 is spaced from the first end 350 of the bracket 302 by a relatively small or certain distance. In some examples, the adapter 376 is part of the bracket 302, and/or the bracket 302 and the adapter 376 define an integral or one-piece component. In particular, the adapter 376 of FIG. 3D can directly contact a certain area (e.g., an internal area) of the catch device 372 (e.g., when the external force(s) 212 is/are applied to the panel held by the bracket 302), thereby substantially maintaining the first position of the bracket 302 as well as the first state of the sunroof 102.

Similar to the drive shoe 308, the catch device 372 is movable relative to the link 310 and, in particular, relative to the bracket 302 and/or the adapter 376 thereon. For example, the catch device 372 can slide along the rail 304 from a first position relative to the adapter 376 (as shown in FIG. 3D) to a second position relative to the adapter 376 (shown in FIG. 3E) different from the first position. The first position of the catch device 372 can be an engaged position in which the catch device 372 and the adapter 376 are substantially engaged with each other, while the second position of the catch device 372 can be a disengaged position in which the catch device 372 and the adapter 376 are disengaged and/or separated from each other. Additionally or alternatively, the first position of the catch device 372 can be a position in which the adapter 376 is inserted or positioned in the catch device 372. In any case, the catch device 372 is connected to the motor(s) 106 via a sunroof cable (and the like) extending from the catch device 372 to the motor(s) 106, where tension in the sunroof cable can be utilized to pull the catch device 372. For example, similar to the drive shoe 308, a receiver (e.g., a cable receiver) attached to the catch device 372 can be coupled to the sunroof cable. In such examples, the catch device 372 can be moved relative to the adapter 376 (a) in the first direction 316 during the sunroof opening operation and/or (b) in the second direction 318 during the sunroof closing operation. Additionally, the catch device 372 and the drive shoe 308 can be configured to move cooperatively together or in tandem during sunroof operation.

Figure 3E:
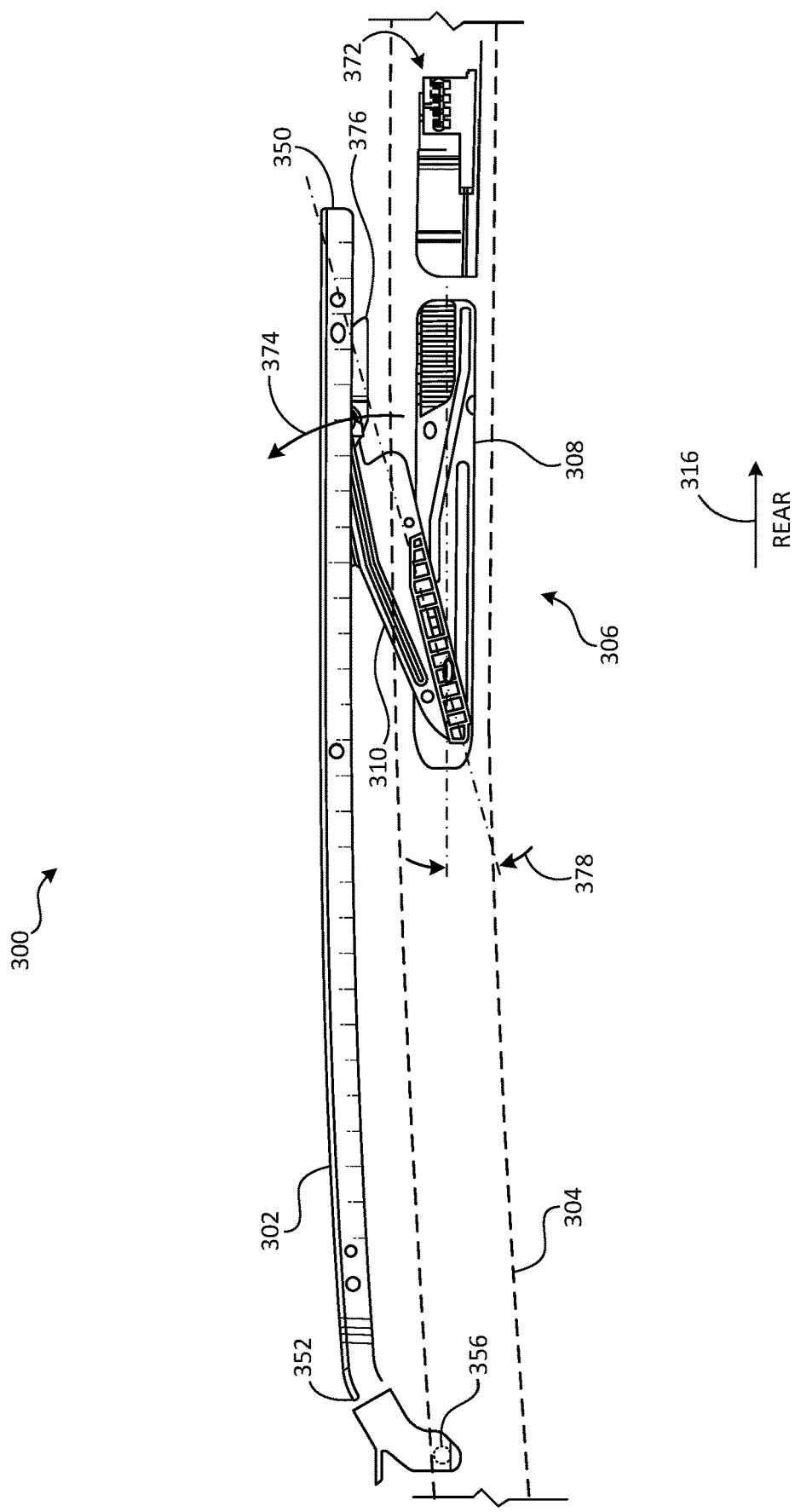

Turning to FIG. 3E, another side-view of the vehicle sunroof assembly 300 is shown. In FIG. 3E, the bracket 302 is in the third position thereof, where the first and second ends 350, 352 of the bracket 302 are substantially raised and/or even with respect to height. In contrast to the illustrated example of FIG. 3D, the drive shoe 308 moved along the rail 304 in the first direction 316 from the first position to a third position (e.g., a final drive shoe position) relative to the link 310 different from the second position. As a result, the link 310 rotated relative to the drive shoe 308 about the second axis 329 in the first rotational direction 374 from the first orientation to the target orientation in which the link 310 is separable from the first guide block 334. The link 310 of FIG. 3E can rotate across a relatively large or certain angle 378 when moving from the first orientation to the target orientation. For example, the angle 378 of FIG. 3E is about 15 degrees. In some examples, the first orientation of the link 310 provides a fully lowered position of the first end 350 of the bracket 302, and the target orientation of the link 310 provides a fully raised position of the first end 350 of the bracket 302.

In further contrast to the illustrated example of FIG. 3D, the drive mechanism 306 transitioned from the first state to the second state, and the drive shoe 308 dragged or pulled the link 310 and the bracket 302 along the rail 304 in the first direction 316 to enable the fifth pin 356 and the second guide block 358 to lift the second end 352 of the bracket 302 to a height position that substantially matches a height position of the first end 350 of the bracket 302. Additionally, the catch device 372 of FIG. 3E is in the second position thereof, where the catch device 372 is separated from the bracket 302 and the adapter 376 thereon. In FIG. 3E, the drive mechanism 306 is interposed between the bracket 302 and the rail 304, which provides support to the bracket 302 or at least the first end 350 of the bracket 302. Whereas the fifth pin 356 associated with the second end 352 of the bracket 302 is slidably engaged with rail 304 and positioned in a certain slot (e.g., the eighth slot 370) in the rail 304, which provides support to the second end 352 of the bracket 302. As such, the bracket 302 of FIG. 3E is substantially supported by the rail 304 and the drive mechanism 306.

FIGS. 4A, 4B, and 4C are detailed views of the drive shoe 308 and show different stages (e.g., initial or beginning stages) of the previously described sunroof opening operation with respect to the drive shoe 308 and the first and second pins 320, 324 on the link 310. According to the illustrated examples of FIGS. 4A, 4B, and 4C, the drive mechanism 306 is assembled, and the drive shoe 308 is being moved (e.g., via the motor(s) 106) in the first direction 316 relative to the link 310 from the first drive shoe position to the third drive shoe position previously described. Further, the first pin 320 on the link 310 is positioned in the first slot 326 and abutting one or more internal surfaces of the drive shoe 308 that define the first slot 326, while the second pin 324 on the link 310 is positioned in the second slot 328 and abutting one or more additional internal surfaces of the drive shoe 308 that define the second slot 328. Additionally, the drive shoe 308 of FIGS. 4A, 4B, and 4C is slidably disposed in a primary guide channel 402 extending through the rail 304, where the drive shoe 308 can slide against opposing surfaces (e.g., top and bottom surfaces) 404, 406 of the rail 304 that define the primary guide channel 402.

In FIGS. 4A, 4B, and 4C, the first slot 326 and the second slot 328 are sized and/or shaped in connection with precisely controlling, via the first and second pins 320, 324, relative movement of the link 310 during sunroof operation. In some examples, the first slot 326 and the pin 320, together, facilitate controlling one or more angular motion parameters of the link 310 during sunroof operation such as, for example, any of an angular position of the link 310, an angular speed of the link 310, and the like. Additionally, in some examples, the second slot 328 and the second pin 324, together, facilitate providing and substantially maintaining the second axis 329 of the link 310 during sunroof operation.

Turning to FIG. 4A, a first or initial stage of the sunroof opening operation is shown. According to the illustrated example of FIG. 4A, the drive shoe 308 is in the first position thereof relative to the link 310, where the first pin 320 is positioned substantially at a first end 408 of the first slot 326 and the second pin 324 is positioned substantially at a first end 410 of the second slot 328. In FIG. 4A, each of the first and second slots 326, 328 form and/or define a path along which a pin can travel. In some examples, a first path (e.g., a non-linear path) 412 defined by the first slot 326 extends through the drive shoe 308 from the first end 408 of the first slot 326 to a second end 414 of the first slot 326 opposite to the first end 408. The first end 408 of the first slot 326 is sometimes referred to as an opposite end of the first slot 326, with respective to the second end 414 of the first slot 326. In such examples, the first pin 320 can travel along the first path 412 from the first end 408 of the first slot 326 to the second end 414 of the first slot 326. Further, in some examples, a second path (e.g., a linear path) 416 defined by the second slot 328 extends through the drive shoe 308 from the first end 410 of the second slot 328 to a second end 418 of the second slot 328 opposite to the first end 410 (i.e., an opposite end of the second slot 328). In such examples, the second pin 324 can travel along the second path 416 from the first end 410 of the second slot 328 to the second end 418 of the second slot 328. As the drive shoe 308 of FIG. 4A moves relative to the link 310, the internal surface(s) of the drive shoe 308 slide against and/or apply certain forces or loads to the respective first and second pins 320, 324, thereby guiding movement of the first and second pins 320, 324 and/or substantially keeping the first and second pins 320, 324 on the respective first and second paths 412, 416.

The drive shoe 308 of FIG. 4A has a first dimension (e.g., a length) 420 and a second dimension (e.g., a height) 422 different from the first dimension 420. As shown in FIG. 4A, the first dimension 420 is substantially greater than the second dimension 422. Additionally, the drive shoe 308 includes a first end (e.g., a rear end) 424 and a second end (e.g., a front end) 426 opposite to the first end 424. The first end 424 of the drive shoe 308 is proximate to or adjacent the first end 408 of the first slot 326, while the second end 426 of the drive shoe 308 is proximate to or adjacent the second end 418 of the second slot 328. In particular, the first slot 326 of FIG. 4A non-linearly extends away from the first end 424 of the drive shoe 308 toward the second end 426 of the drive shoe 308 across the first dimension 420 and the second dimension 422. On the other hand, the second slot 328 linearly extends away from the second end 426 of the drive shoe 308 toward the first end 424 of the drive shoe 308 across only the first dimension 420.

As shown in FIG. 4A, the second path 416 provided by the second slot 328 is substantially linear, wherein the second path 416 extends only in a length direction of the drive shoe 308 but not in a height direction of the drive shoe 308. In contrast, the first path 412 provided by the first slot 326 is substantially non-linear, wherein the first path 412 extends in both the length direction and the height direction of the drive shoe 308. In some examples, the first slot 326 includes a first section 428, a second section 430 adjacent the first section 428, and a third section 432 adjacent the second section 430. That is, the second section 430 of the first slot 326 is between the first and third sections 428, 432 and/or connects the first section 428 to the third section 432. In such examples, each of the first and third sections 428, 432 of the first slot 326 is substantially horizontal and/or linearly extends only in the length direction of the drive shoe 308, which facilitates maintaining the relative orientation of the link 310.

In some examples, as the first pin 320 slides through the first or third section 428, 432 of the first slot 326, the drive shoe 308 imparts one or more loads on the first pin 320 that substantially prevent the relative orientation of the link 310 from changing. On the other hand, the second section 430 of the first slot 326 is substantially inclined and/or curved. In particular, unlike the first and third section 428, 432, the second section 430 extends partially in the height direction of the drive shoe 308, which facilitates changing the relative orientation of the link 310. In some examples, as the first pin 320 slides through the second section 430 of the first slot 326, the drive shoe 308 imparts one or more additional loads on the first pin 320 that urge the link 310 to rotate about the second axis 329. Thus, changes in relative orientation of the link 310 are substantially based on changes in a height position of the first pin 320 relative to the drive shoe 308. As such, the second section 430 can be particularly shaped and/or designed to provide one or more desired angular motion parameters of the link 310 during sunroof operation.

To facilitate changing the state of the drive mechanism 306 cooperatively with the first guide block 334 and/or maintaining the drive mechanism 306 in the second state, the first slot 326 and/or, more generally, the drive shoe 308 of FIG. 4A also includes an example locking area 434 to receive and temporarily hold the first pin 320 during sunroof operation (e.g., when the drive shoe 308 approaches and/or reaches the third or final drive shoe position). The locking area 434 is adjacent the third section 432 of the first slot 326 and/or connected to the third section 432, such that the first pin 320 can easily pass between the third section 432 and the locking area 434. In some examples, the locking area 434 is positioned substantially at the second end 414 of the first slot 326, which provides for an increased angular displacement of the link 310. The locking area 434 may also be positioned substantially at a central portion of the drive shoe 308 that is between the first and second ends 424, 426 of the drive shoe 308. In particular, the drive mechanism 306 transitions from the first state to the second state in response to the first pin 320 entering the locking area 434, as will be discussed further below. Additionally, while the first pin 320 is in the locking area 434, horizontal translation of the link 310 and the bracket 302 along the rail 304 is allowed. In some examples, the drive shoe 308 is configured to engage opposite sides of the first pin 320 while the first pin 320 is in the locking area 434, such that movement of the drive shoe 308 in the first or second direction 316, 318 causes the link 310 and the bracket 302 to move in the same direction together with the drive shoe 308.

As shown in FIG. 4A, a width of the first slot 326 is substantially uniform or constant across the first, second, and third sections 428, 430, 432, whereas the width of the first slot 326 increases or expands across the locking area 434. In some examples, the first slot 326 flares at the second end 414 thereof. Accordingly, the locking area 434 may be wider than each of the first, second, and third sections 428, 430, 432 of the first slot 326. Stated differently, in some examples, the locking area 434 has a first width that is greater than a second width of a section (e.g., the third section 432) of the first slot 326 adjacent the locking area 434.

Turning to FIG. 4B, a subsequent or second stage of the sunroof opening operation is shown. According to the illustrated example of FIG. 4B, the drive shoe 308 is in the second position relative to the link 310, where the first pin 320 is in the third section 432 of the first slot 326 to provide the second orientation of the link 310. In contrast to the illustrated example of FIG. 4A, the drive shoe 308 moved in the first direction 316 relative to the link 310 through the primary guide channel 402, and the first pin 320 passed through the second section 430 of the first slot 326 from the first section 428 to the third section 432. In particular, the intermediate state of the sunroof 102 is provided and substantially maintained while the first pin 320 remains in the third section 432 of the first slot 326.

Turning to FIG. 4C, a subsequent or third stage of the sunroof opening operation is shown. According to the illustrated example of FIG. 4C, the drive shoe 308 is in the third position thereof relative to the link 310, where the first pin 320 is positioned at the second end 414 of the first slot 326 and the second pin 324 is positioned at the second end 418 of the second slot 328. In contrast to the illustrated example of FIG. 4B, the drive shoe 308 moved further in the first direction 316 relative to the link 310 through the primary guide channel 402, and the first pin 320 entered the locking area 434. In some examples, a highest rotation angle of the link 310 is achieved when the drive shoe 308 reaches the third drive shoe position due to the positioning of the locking area 434, and the link 310 may have a relatively large angular displacement as a result. In such examples, the first pin 320, the second pin 324, the first slot 326, and the second slot 328, together, are structured such that movement of the drive shoe 308 relative to the link 310 from the first drive shoe position to the third drive shoe position rotates the link 310 about the second axis 329 in a single rotational direction (e.g., the first rotational direction 374) from the first orientation to the target orientation, as will be discussed further below in connection with FIG. 11. In FIG. 4C, the link 310 is substantially tilted and/or angled relative to the drive shoe 308. Further, the angle 378 previously described may be defined by a horizontal axis and a fourth axis 437 that is aligned to and/or extending through the first and second pins 320, 324 of the link 310.

According to the illustrated example of FIG. 4C, when the first pin 320 enters the locking area 434, the drive shoe 308 is configured to impart one or more loads on the first pin 320 that urge the link 310 into the target orientation and enable the link 310 and the bracket 302 to slide along the rail 304 together with the drive shoe 308 in the length direction of the vehicle 100. In some examples, the drive shoe 308 applies a first or primary load 436 to the first pin 320 having a vertical force component. Further, in some examples, the drive shoe 308 applies a second load 438 and/or a third load 440 to the first pin 320, each of which has a horizontal force component. As shown in FIG. 4C, the drive shoe 308 is engaged with a rear portion 442 of the first pin 320 and a front portion 444 of the first pin 320 opposite to the rear portion 442, which allows the drive shoe 308 to effectively drag or pull the link 310 and, consequently, the bracket 302 and the panel held by the bracket 302. As such, in some examples, the drive shoe 308 is configured to directly contact the rear portion 442 and the front portion 444 of the first pin 320 when the first pin 320 is in the locking area 434. Such engagement of the drive shoe 308 and the first pin 320, as depicted in FIG. 4C, can maintain the target orientation as well as a position of the link 310 relative to the drive shoe 308 during a final stage of the sunroof opening operation.

In some examples, while the link 310 of FIG. 4C is held or locked in the target orientation, the drive shoe 308 is configured to impart the second load 438 on the front portion 444 of the first pin 320, thereby urging the link 310 and the bracket 302 to move along the rail 304 in the first direction 316 together with the drive shoe 308. In this manner, the third and fourth pins 340, 344 on the link 310 can disconnect and/or separate from the first guide block 334 and pass into the rail 304 via the fifth and sixth slots 364, 366. Conversely, in some examples while the link 310 of FIG. 4C is held or locked in the target orientation, the drive shoe 308 is configured to impart the third load 440 on the rear portion 442 of the first pin 320 during the sunroof closing operation, thereby urging the link 310 and the bracket 302 to move along the rail 304 in the second direction 318 together with the drive shoe 308. In this manner, the third and fourth pins 340, 344 and/or, more generally, the link 310 can reconnect to and/or slidably engage the first guide block 334. In response to the link 310 reconnecting with the first guide block 334, the first pin 320 of FIG. 4C may exit the locking area 434 and enter the third section 432 of the first slot 326 resulting from the first guide block 334 applying reaction load(s) to the third pin 340 and/or the fourth pin 344. As shown in FIG. 4C, the first pin 320 is positioned at an uppermost (in the orientation of FIG. 4C) portion of the drive shoe 308 between the first and second ends 424, 426 thereof, while the second pin 324 is positioned at a lowermost (in the orientation of FIG. 4C) portion of the drive shoe 308 adjacent the second end 426 thereof.

Figure 5A:
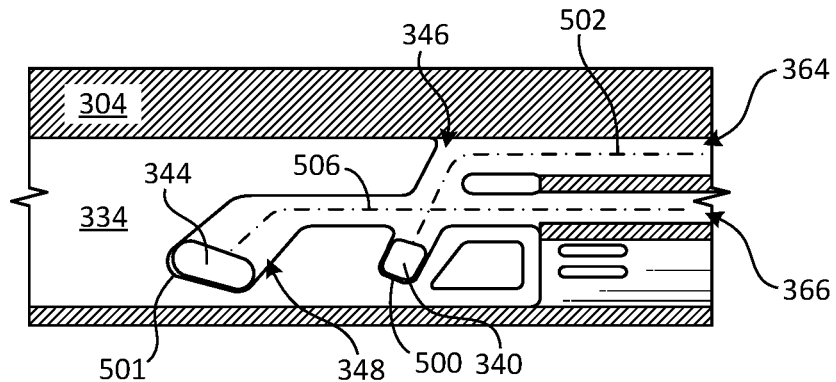
FIGS. 5A, 5B, and 5C are detailed views of an example guide block and show the different stages of the sunroof opening operation.
Figure 5B:
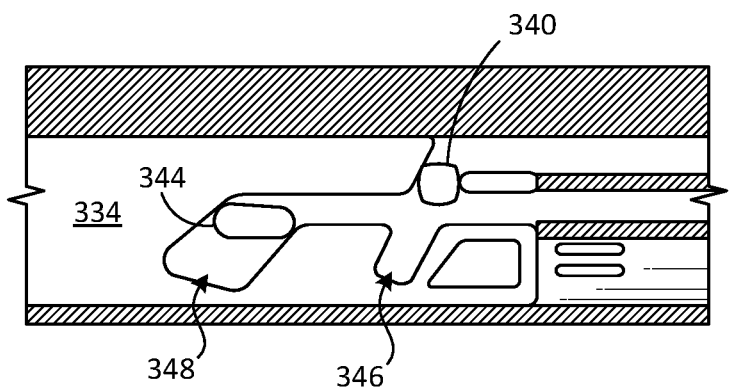
Figure 5C:
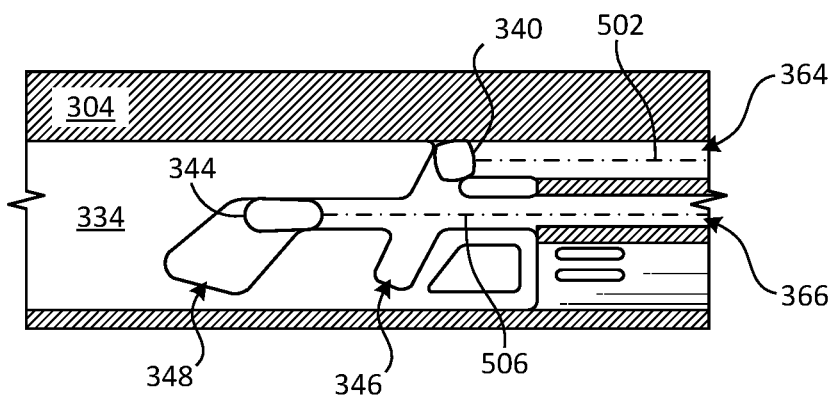

FIGS. 5A, 5B, and 5C are detailed views of the first guide block 334 and show the different stages of the sunroof opening operation with respect to the first guide block 334 and third and fourth pins 340, 344 on the link 310. According to the illustrated examples of FIGS. 5A, 5B, and 5C, the drive shoe 308 is urging the link 310 to rotate about the second axis 329 in the first rotational direction 374 from the first orientation to the target orientation, such that the third and fourth pins 340, 344 slide through the respective third and fourth slots 346, 348 in the first guide block 334. In FIGS. 5A, 5B, and 5C, the third slot 346 and the fourth slot 348 are sized and/or shaped in connection with supporting the link 310 via the third and fourth pins 340, 344 during the first stage, the second stage, and at least part of the third stage of the sunroof opening operation.

Turning to FIG. 5A, the first stage of the sunroof opening operation is shown. According to the illustrated example of FIG. 5A, the link 310 is in the first orientation relative to the drive shoe 308 and the first guide block 334, where the third pin 340 is positioned at an end 500 of the third slot 346 and the fourth pin 344 is positioned at an end 501 of the fourth slot 348. The third slot 346 of FIG. 5A defines a third path (e.g., a non-linear path) 502 extending through the first guide block 334 along which the third pin 340 can travel during sunroof operation. As the third pin 340 of FIG. 5A moves through the third slot 346 across the third path 502 and away from the end 500 of the third slot 346, the internal surface(s) of the first guide block 334 slide against the third pin 340 to provide support to the link 310. In such examples, the third path 502 extends from the end 500 of the third slot 346 to the fifth slot 364 in the rail 304, where the third pin 340 can travel along the third path 502 from the end 500 of the third slot 346 to the fifth slot 364. As such, the third path 502 can be at least partially formed and/or defined by the fifth slot 364.

Further, the fourth slot 348 of FIG. 5A forms and/or defines a fourth path (e.g., a non-linear path) 506, different from the third path 502, extending through the first guide block 334 along which the fourth pin 344 can travel during sunroof operation. In some examples, as the fourth pin 344 moves through the fourth slot 348 across the fourth path 506 and away from the end 501 of the fourth slot 348, the internal surface(s) of the first guide block 334 slide against the fourth pin 344 to provide additional support to the link 310. In such examples, the fourth path 506 extends from the end 501 of the fourth slot 348 to the sixth slot 366 in the rail 304, where the fourth pin 344 can travel along the fourth path 506 from the end 501 of the fourth slot 348 to the sixth slot 366. As such, the fourth path 506 can be at least partially formed and/or defined by the sixth slot 366.

Turning to FIG. 5B, the second stage of the sunroof opening operation is shown. As such, the link 310 is in the second orientation relative to the drive shoe 308 and the first guide block 334, and the sunroof 102 is in the intermediate state. In contrast to the illustrated example of FIG. 5A, the link 310 rotated about the second axis 329 in the first rotational direction 374, and the third and fourth pins 340, 344 travelled partially across the respective third and fourth paths 502, 506. According to the illustrated example of FIG. 5B, each of the third and fourth pins 340, 344 is supported by the internal surface(s) of the first guide block 334. Thus, during the first and second stages of the sunroof opening operation, the link 310 remains substantially engaged with the first guide block 334 via the third and fourth pins 340, 344. Moreover, engagement of the first guide block 334 and the third and fourth pins 340, 344 during the first and second stages prevents the link 310 from separating from the first guide block 334, until the link 310 reaches the target orientation.

Turning to FIG. 5C, the third stage of the sunroof opening operation is shown. As such, the link 310 is in the target orientation relative to the drive shoe 308 and the first guide block 334, and the third and fourth pins 340, 344 are positioned at topmost portions of the respective third and fourth slots 346, 348. In contrast to the illustrated example of FIG. 5B, the link 310 further rotated about the second axis 329 in the first rotational direction 374 as a result of the first pin 320 entering the locking area 434 and receiving the primary load 436 from the drive shoe 308. In some examples, the third pin 340, the fourth pin 344, the third slot 346, and the fourth slot 348, together, are structured such that each of the third and fourth pins 340, 344 remains in direct contact with the first guide block 334 at all orientations of the link 310 to reduce operational noise. That is, engagement of the third pin 340 and the first guide block 334 is substantially maintained until the third pin 340 enters the rail 304, and engagement of the fourth pin 344 and the first guide block 334 is substantially maintained until the fourth pin 344 enters the rail 304. As a result, the third and fourth pins 340, 344 are prevented from slipping out of the first guide block 334 under high loading conditions, and related noise is substantially reduced and/or eliminated.

According to the illustrated example of FIG. 5C, the link 310 is separable from the first guide block 334 due to the link 310 being in the target orientation. In particular, the third and fourth pins 340, 344 of FIG. 5C can slide horizontally through the first guide block 334 in the first direction 316 across linear sections of the respective third and fourth paths 502, 506, thereby exiting the first guide block 334 and entering the rail 304 in a controller manner, where the rail 304 slidably supports the third and fourth pins 340, 344. While the third and fourth pins 340, 344 are positioned in the respective fifth and sixth slots 364, 366, the rail 304 is configured to impart certain loads (e.g., vertical loads) on the respective third and fourth pins 340, 344 that substantially keep the link 310 in the target orientation, while allowing the link 310 to slide horizontally along the rail 304 together with the drive shoe 308.

Figure 6A:
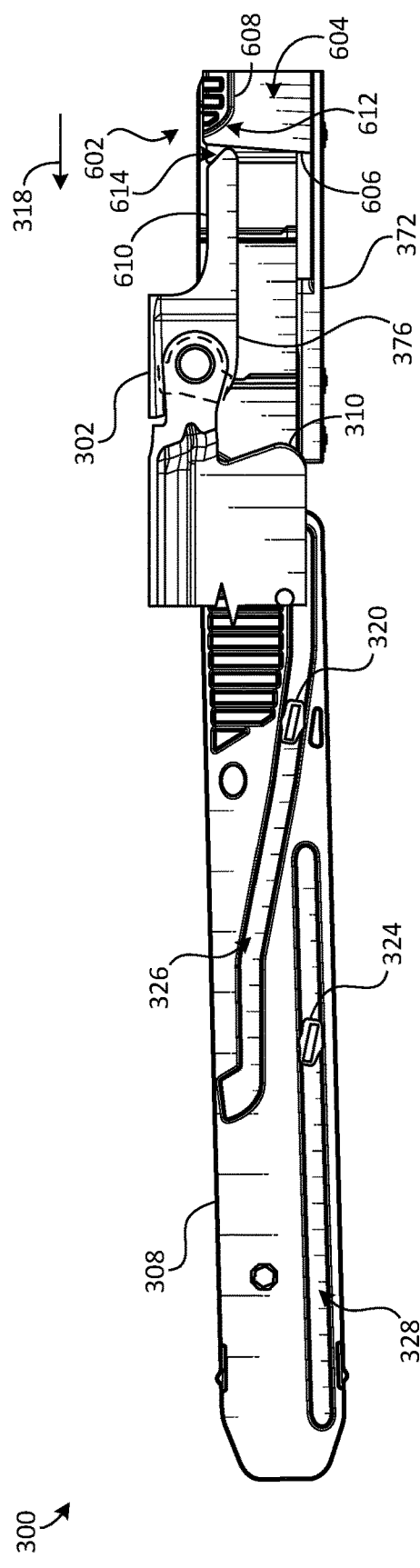
FIGS. 6A and 6B are partial views of the example assembly and show different stages of a sunroof closing operation.
Figure 6B:
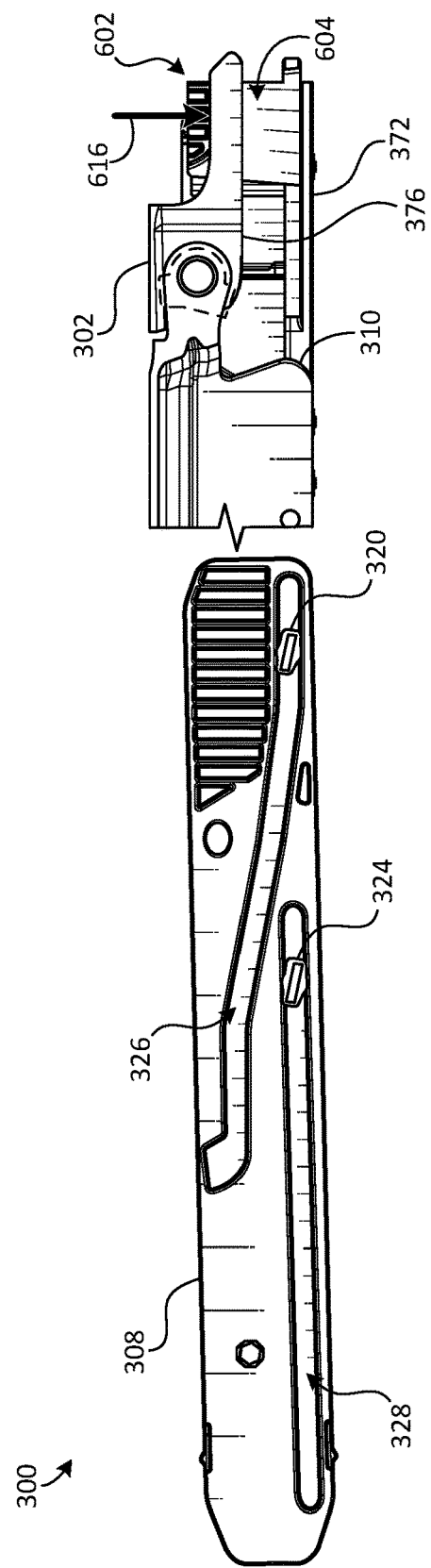

FIGS. 6A and 6B are partial side-views of the vehicle sunroof assembly 300 and show different example stages (e.g., final stages) of the previously described sunroof closing operation. According to the illustrated examples of FIGS. 6A and 6B, the bracket 302 (a relatively small portion of which is shown) is substantially in the first position thereof, while the catch device 372 is being moved in the second direction 318 toward the adapter 376 such that the adapter 376 passes into an example structure 602 on the catch device 372. Additionally, the drive shoe 308 is being moved in the second direction 318 relative to the link 310, where the first and second pins 320, 324 are approaching the first ends 408, 410 of the first and second slots 326, 328.

To facilitate catching, holding, and/or releasing the adapter 376, the catch device 372 can be provided with the structure 602. In particular, an example channel (e.g., U-shaped channel) 604 in the structure 602 is configured to receive the adapter 376 when the bracket 302 is in the first position thereof. The channel 604 extends at least partially through the structure 602 along an axis thereof. As such, the adapter 376 is insertable or positionable in the channel 604, for example, at a certain stage of the sunroof closing operation. More particularly, when the adapter 376 is in the channel 604 (as shown in FIG. 6B), the structure 602 is configured to engage the adapter 376 to maintain the bracket 302 in the first position and/or restrict deflection (e.g., upward deflection) of the bracket 302

Turning to FIG. 6A, the catch device 372 is approaching the adapter 376, where there is no physical interaction between bracket 302 and the catch device 372. The adapter 376 may eventually pass into the channel 604 via an opening in a first end 606 of the structure 602. To facilitate smooth engagement and/or disengagement, the structure 602 can be provided with a first guide or contact surface 608 that is internal to the structure 602. Further, a second guide or contact surface 610 may be provided on the adapter 376, which is associated with the first contact surface 608. In some examples, the first contact surface 608 is configured to slide against the second contact surface 610 on the adapter 376 as the adapter 376 passes into the channel 604. Additionally, each of the first contact surface 608 and/or the second contact surface 610 has an area that is substantially inclined and/or curved. In such examples, the first contact surface 608 can be provided with a first ramped area 612 configured to slidably engage and/or directly contact a second ramped area 614 of the second contact surface 610 to finely adjust a position of the bracket 302. In this manner, examples disclosed herein account for a certain positional variance of the bracket 302 that can result from the external force(s) 212 as the sunroof closing operation is completed.

Turning to FIG. 6B, the catch device 372 is in the first position thereof relative to the adapter 376, and the adapter 376 is positioned in the channel 604. In contrast to the illustrated example of FIG. 6A, the catch device 372 moved (e.g., via the motor(s) 106) in the second direction 318 toward the adapter 376, where the adapter 376 passed into the channel 604. According to the illustrated example of FIG. 6B, the catch device 372 can impart a certain load 616 on the adapter 376 that counteracts the external force(s) 212 and/or maintains the bracket 302 in the first bracket position thereof. Additionally, the catch device 372 of FIG. 6B is configured to resist a different, reaction load applied to the structure by the adapter 376.

Figure 7:
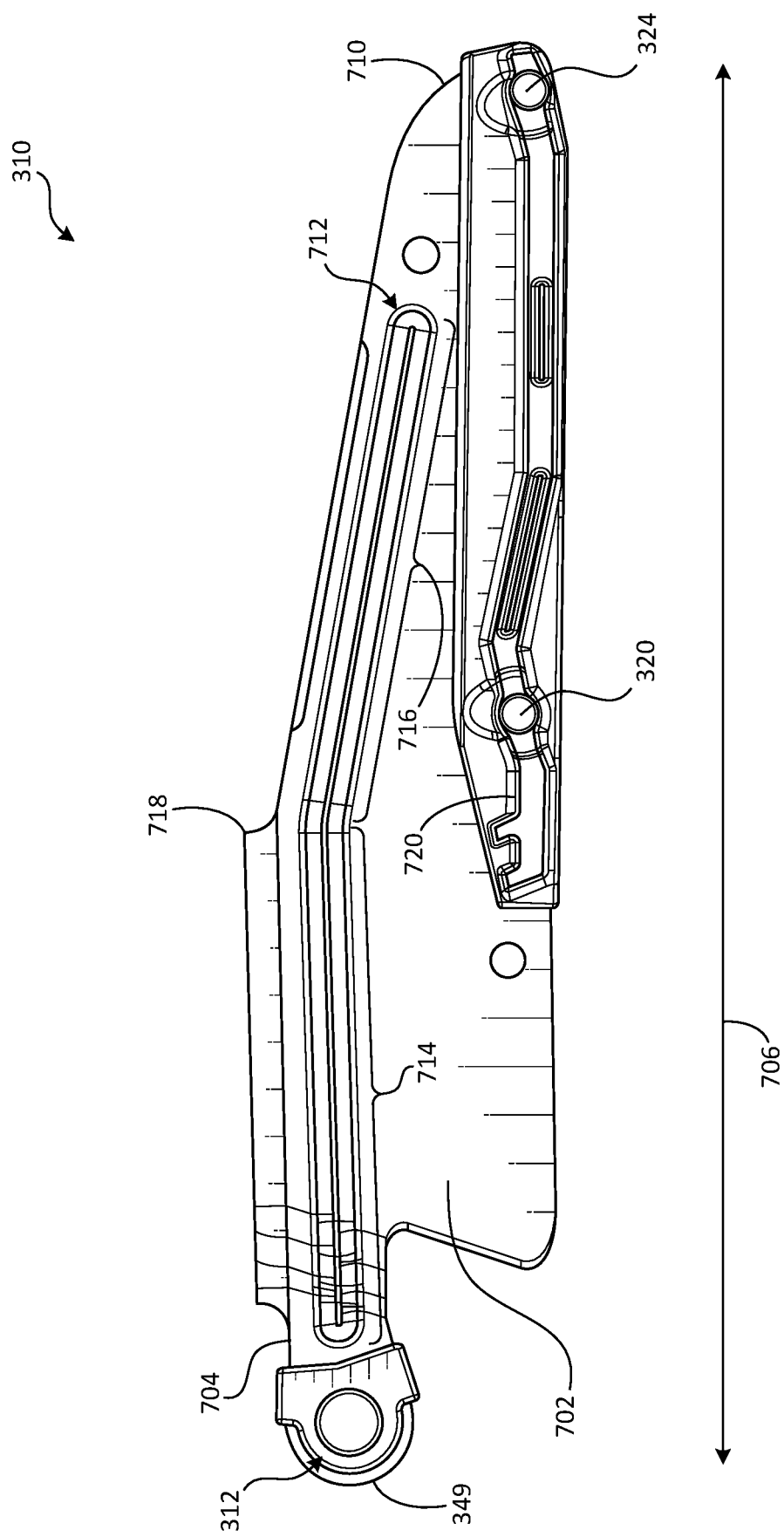
FIG. 7 is a detailed view of an example link in accordance with the teachings of this disclosure.

FIG. 7 is a detailed view of the link 310 and shows an implementation thereof. According to the illustrated example of FIG. 7, the link 310 includes an example link body 702 and an example arm (e.g., a lever arm) 704 on the link body 702 that projects from the link body 702. The arm 704 is configured to receive and/or connect to the part of the bracket 302 that is between the first and second ends 350, 352 of the bracket 302 to create the first movable joint 312. The arm 704 can be fixedly coupled to the body 702, for example, via one or more example fasteners and/or one or more fastening methods or techniques. Further, one or more (e.g., all) of the first pin 320, the second pin 324, the third pin 340, and/or the fourth pin 344 can be similarly coupled to the link body 702. Accordingly, forces resulting from sunroof operation can be transmitted through the arm 704 and the link body 702 between the first movable joint 312 and one or more (e.g., all) of the pin(s) 320, 324, 340, 344 on the link 310. In some examples, a length 706 of the arm 704 is relatively short to allow for a substantial reduction in such forces. The length 706 of FIG. 7 is defined by the first end 349 of the link 310 corresponding to a portion of the arm 704 and a second end 710 of the link 310 corresponding to a portion of the link body 702 opposite to the first end 349.

In some examples, the link 310 is provided with at least one elongated bead 712 coupled thereto. In FIG. 7, the elongated bead 712 extends along the link 310 in a length direction of the link 310 between the first and second ends 349, 710 of the link 310. In particular, the elongated bead 712 of FIG. 7 is configured to increase a cross-sectional stiffness of the link 310. In such examples, the elongated bead 712 can be positioned on at least a portion of the arm 704 adjacent the first movable joint 312. Additionally or alternatively, the elongated bead 712 can be positioned on at least a portion of the link body 702. In FIG. 7, the elongated bead 712 is defined by both the link body 702 and the arm 704. Further, the elongated bead 712 of FIG. 7 extends alongside or adjacent a topmost (in the orientation of FIG. 7) portion of the link 310 away from the first movable joint 312 toward the second pin 324.

As shown in FIG. 7, the elongated bead 712 extends across at least half of the length 706 of the link 310. In some examples, the elongated bead 712 may include a first segment (e.g., a linear segment) 714 and a second segment (e.g., a linear segment) 716 adjacent the first segment 714. The first segment 714 is arranged along a part of the link 310 and linearly extends in a first direction, while the second segment 716 is arranged along a different part of the link 310 and linearly extends in a second direction different from the first direction. As shown in FIG. 7, the first segment 714 can be substantially angled relative to the second linear segment 716. That is, an axis of the first segment 714 and an axis of the second segment 716 may define a relatively small angle.

Additionally, in some examples, the link 310 is provided with an example flange 718 coupled thereto adjacent the elongated bead 712. In FIG. 7, the flange 718 extends along the link 310 in the length direction of the link 310 between the first and second ends 349, 710 of the link 310. In particular, the flange 718 of FIG. 7 is configured to increase strength and/or rigidity of the link 310. In such examples, the flange 718 can be positioned on at least a portion of the arm 704 adjacent the first movable joint 312. Additionally or alternatively, the flange 718 can be positioned on at least a portion of the link body 702. In FIG. 7, the flange 718 is defined by both the link body 702 and the arm 704. Further, the flange 718 of FIG. 7 extends along the topmost portion of the link 310 away from the first movable joint 312 toward the second pin 324.

Additionally, in some examples, the link 310 is provided with an overmolded portion 720 coupled thereto. In FIG. 7, the overmolded portion 720 is arranged on outer surface of the link body 702 and covering the first, second, third, and fourth pins 320, 324, 340, 344. The overmolded portion 720 of FIG. 7 is positioned at a bottommost (in the orientation of FIG. 7) portion of the link body 702. In particular, the overmolded portion 720 provides support to the pins 320, 324, 340, 344 as well as stabilizes the link 310 during sunroof operation. In such examples, relatively large surface areas of the overmolded portion 720 are configured to slide against the rail 304 and/or the drive shoe 308 to prevent the link 310 from twisting, as discussed further below in connection with FIG. 9.

Figure 8A:
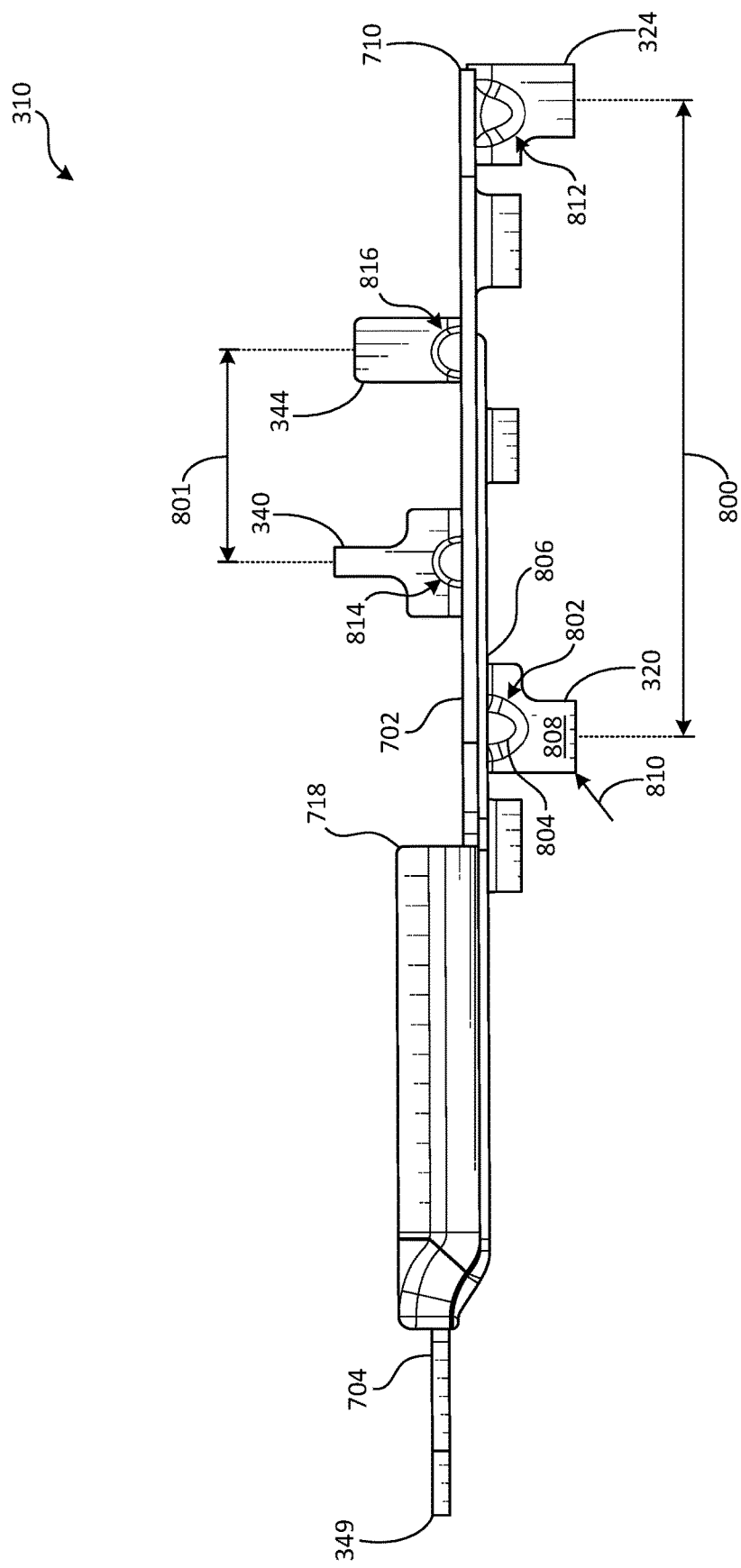

FIGS. 8A, 8B, 8C, 8D, and 8E are other detailed view of the link 310 and show additional implementations thereof. According to the illustrated examples of FIGS. 8A, 8B, 8C, 8D, and 8E, the overmolded portion 720 has been removed from the link body 702, for clarity. Turning to FIG. 8A, a top-view of the link 310 is shown. In FIG. 8A, each of the first pin 320, the second pin 324, the third pin 340, and the fourth pin 344 is fixedly coupled to the link body 702, for example, via one or more fasteners and/or one or more fastening methods or techniques. In some examples, the third and fourth pins 340, 344 are between the first and second pins 320, 324. That is, each of the third and fourth pins 340, 344 can be positioned on an area of the link 310 located substantially between different areas of link 310 on which the respective first and second pins 320, 324 are positioned. In such examples, the first and second pins 320, 324 are positioned farther apart relative to each other compared to the third and fourth pins 340, 344. As shown in FIG. 8A, the second pin 324 is spaced from the first pin 320 by a first distance 800, while the fourth pin 344 is spaced from the third pin 340 by a second distance less 801 than the third distance. Additionally, the first pin 320 of FIG. 8A is positioned at an intermediate portion of the link 310 that is between the first and second ends 349, 710 of the link 310, while the second pin 324 of FIG. 8A is positioned substantially at or adjacent the second end 710 of the link 310.

In some examples, the link 310 includes at least one bead defined by the link body 702 and the first, second, third, or fourth pin 320, 324, 340, 344 configured to reduce stress and/or concentration(s) thereof in the link 310 resulting from a load applied to the link 310. For example, the link 310 of FIG. 8A can be provided with a first example bead 802 coupled thereto. The first bead 802 of FIG. 8A is interposed between the link body 702 and the first pin 320, which increases strength and/or rigidity of the first pin 320. In FIG. 8A, the link body 702 and the first pin 320, together, form and/or define the first bead 802. In some examples, the first bead 802 includes an outer surface (e.g., a substantially continuous surface) 804 having one or more preformed curvatures and/or bends therein. Further, the first bead 802 extends from an outer surface 806 of the link body 702 to an outer surface 808 of the first pin 320 and/or connects the outer surfaces 806, 808 together. In particular, stress resulting from an example load 810 applied to the first pin 320 (by the drive shoe 308) is effectively distributed through the first bead 802, thereby preventing mechanical failure of the link 310 during high loading conditions.

Additionally, in some examples, the link 310 can be provided with multiple beads, each of which corresponds to a respective one of the pins 320, 324, 340, 344. As shown in FIG. 8A, a second bead 812 of the link 310 can be defined by the link body 702 and the second pin 324, a third bead 814 of the link 310 can be defined by the link body 702 and the third pin 340, and a fourth bead 816 of the link 310 can be defined by the link body 702 and the fourth pin 344. In such examples, aspects depicted in connection with the first bead 802 can likewise apply to one or more (e.g., all) of the second bead 812, the third bead 814, the fourth bead 816, and/or any other bead(s) of the link 310.

In some examples, the link 310 of FIG. 8A is a one-piece component. In such examples, at least some or all of the first pin 320, the second pin 324, the third pin 340, the fourth pin 344, the link body 702, the arm 704, the elongated bead 712, the flange 718, the first bead 802, the second bead 812, the third bead 814, and/or the fourth bead 816 are integrally formed, for example, via one or more manufacturing processes, methods, and/or techniques. In any case, any of the first pin 320, the second pin 324, the third pin 340, the fourth pin 344, the link body 702, the arm 704, the elongated bead 712, the flange 718, the overmolded portion 720, the first bead 802, the second bead 812, the third bead 814, the fourth bead 816, and/or, more generally, the link 310 of FIG. 8A can be constructed of one or more materials having desired material properties (e.g., any of strength, rigidity, corrosion resistance, etc.) such as, for example, any of metal, plastic, and the like, or a combination thereof.

Figure 8B:
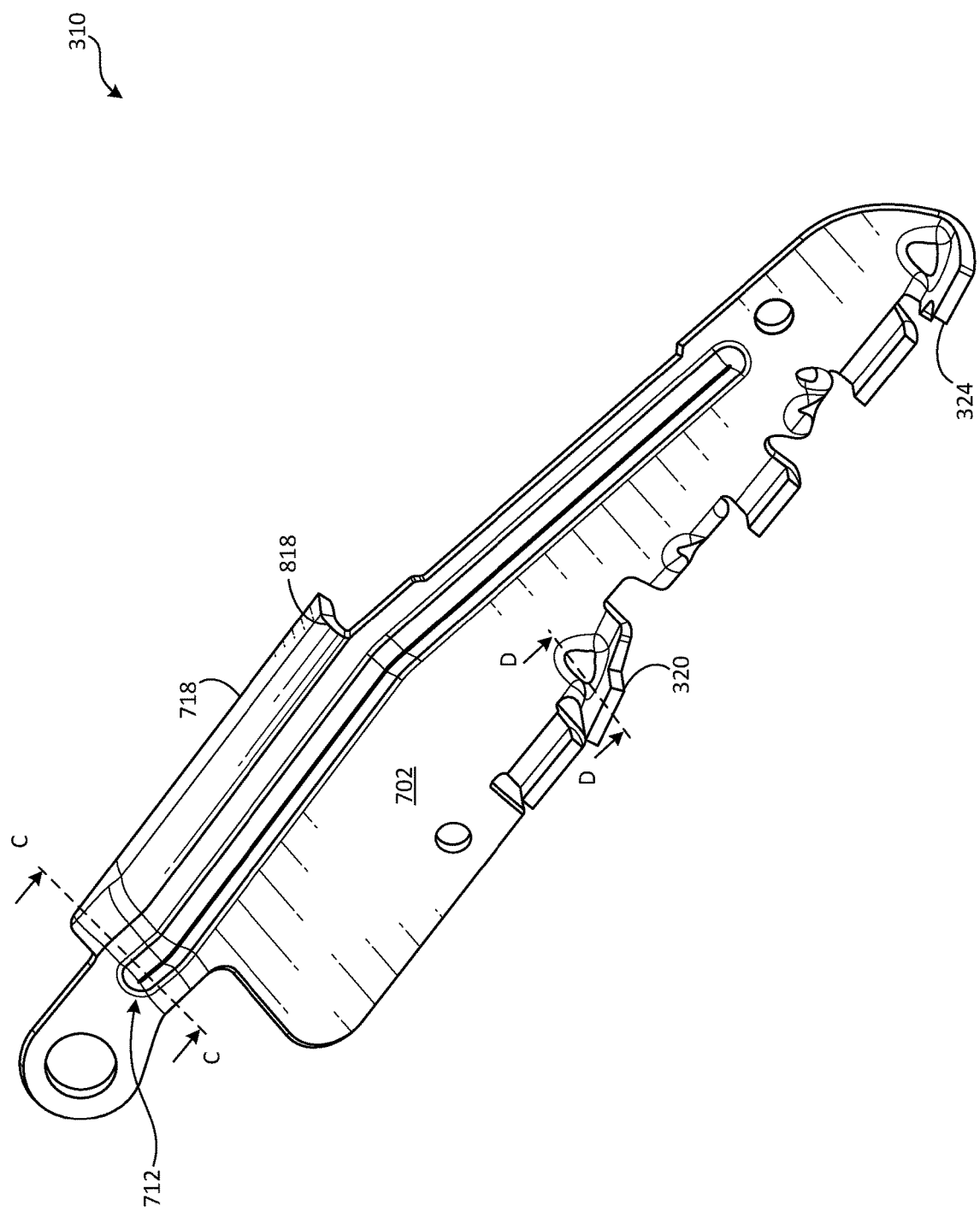

Turning to the FIG. 8B, an isometric view of the link 310 is shown, where the first and second pins 320, 324 on the link body 702 are visible. As shown in FIG. 8B, the flange 718 curves away from the elongated bead 712 and the topmost portion of the link 310. In some examples, the flange 718 is provided with a preformed bend 818 having a certain radius of curvature. In such examples, the radius of curvature can be substantially uniform across the length of the flange 718 or at least part thereof.

Figure 8D:
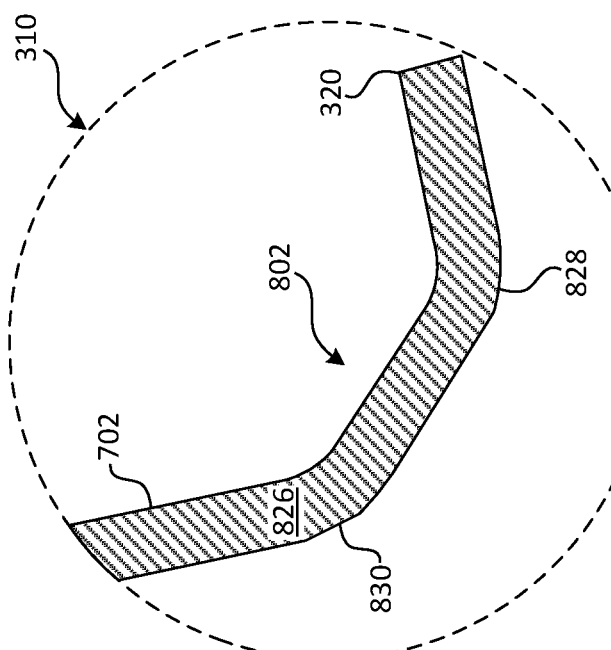
Figure 8C:
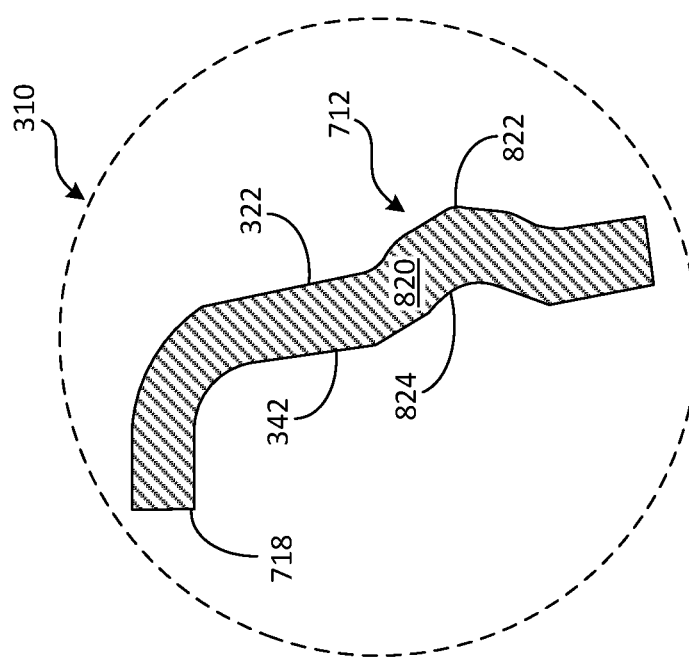

Turning to FIG. 8C, a cross-sectional view of the link 310 along line C-C of FIG. 8B is shown. In particular, a first example cross-sectional area 820 of the link 310 is depicted in the illustrated example of FIG. 8C, where the elongated bead 712 and the flange 718 form and/or define the first cross-sectional area 820 or at least a portion thereof. In some examples, the elongated bead 712 includes a protrusion 822 on the first side 322 of the link 310 and a recess 824 on the second side 342 of the link 310. In such examples, the protrusion 822 protrudes away from the first side 322 of the link 310, while the recess 824 extends at least partially into the second side 342 of the link 310.

Turning to FIG. 8D, a cross-sectional view of the link 310 along line D-D of FIG. 8B is shown. In particular, a second example cross-sectional area 826 of the link 310 is depicted in the illustrated example of FIG. 8D, where the first pin 320, the first bead 802, and the link body 702 form and/or define the second cross-sectional area 826 or at least a portion thereof. In FIG. 8D, the first bead 802 is connected between the first pin 320 and the link body 702. In some examples, the first bead 802 is provided with a first preformed bend 828 having a relatively large or certain radius of curvature to facilitate reducing associated stress concentration(s) resulting from the applied load 810. Similarly, the first bead 802 can also be provided with a second preformed bend 830, different from the first preformed bend 828, having a relatively large or certain radius of curvature to further facilitate reducing the associated stress concentration(s). The first preformed bend 828 of FIG. 8C may serve as an interface of the first bead 802 and the first pin 320, while the second preformed bend 830 may serve as an interface of the first bead 802 and the link body 702.

Turning to FIG. 8E, an additional isometric view of the link 310 is shown, where the second and third pins 340, 344 on the link 310 are visible.

Figure 9:
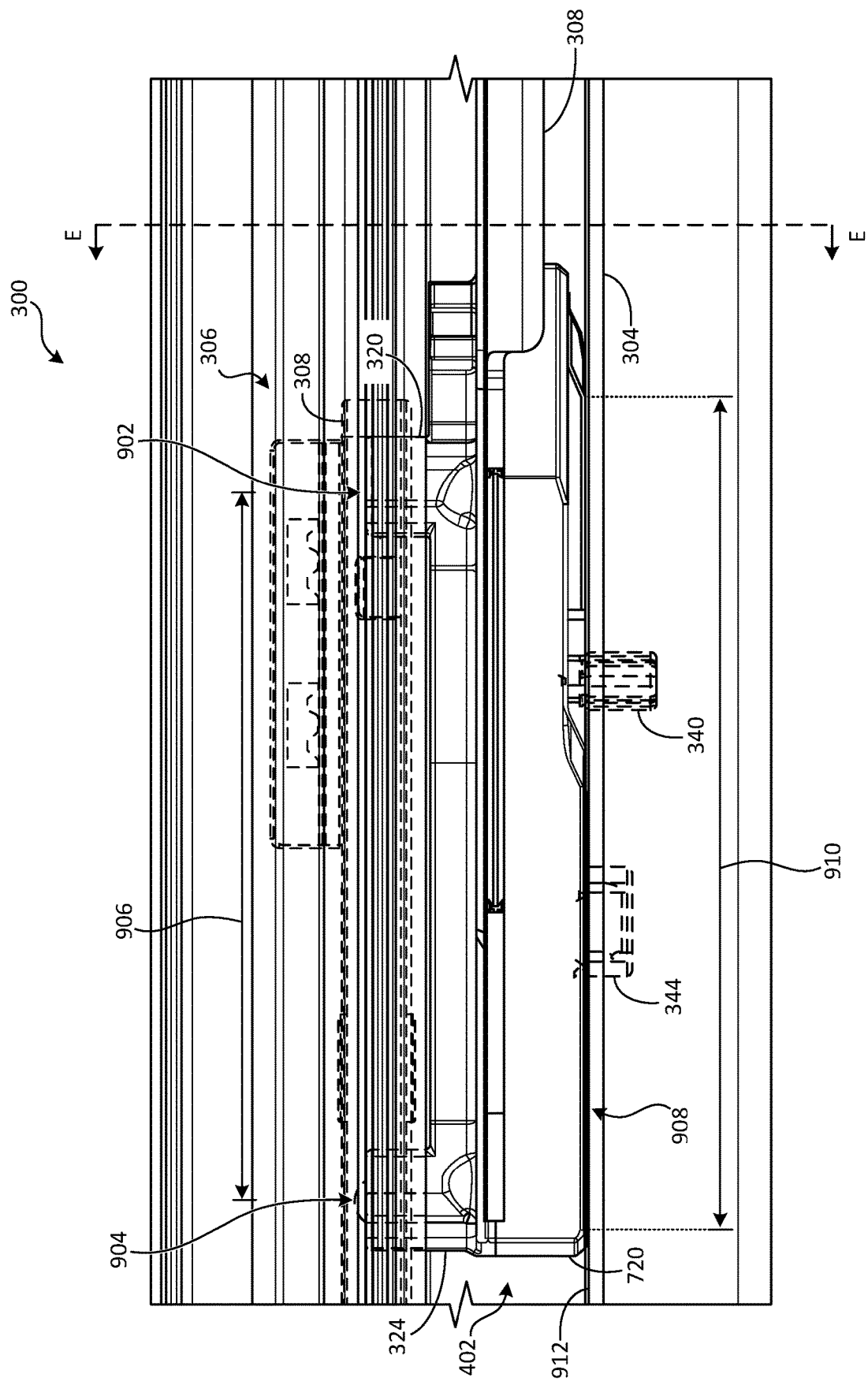
FIG. 9 is a top-view of the example assembly and shows an example drive mechanism positioned in an example sunroof rail.

FIG. 9 is a top-view of the sunroof assembly 300 and shows the drive mechanism 306 in the rail 304. In FIG. 9, each of the drive shoe 308 and the link 310 are slidably disposed in the primary guide channel 402 of the rail 304. The drive shoe 308, which is substantially represented by the dotted/dashed lines of FIG. 9, is covered by a part of the rail 304. Additionally, the first and second pins 320, 324 are engaged with the drive shoe 308, while the third and fourth pins 340, 344 are engaged with the rail 304. Accordingly, the link 310 of FIG. 9 is separated or spaced from the first guide block 334 (not shown) and maintained in the target orientation due to such engagement of the pins.

According to the illustrated example of FIG. 9, the first pin 320 corresponds to a first touch point 902 for the link 310, and the second pin 324 corresponds to a second touch point 904 for the link 310 different from the first touch point 902. The first touch point 902 and the second touch point 904 can be spaced from each other by a third distance 906. In some examples, the overmolded portion 720 defines the first touch point 902 and the second touch point 904. In such examples, each of the first and second touch points 902 and 904 is configured to abut, for example, the drive shoe 308, thereby providing support to the first and second pins 320, 324 and/or stabilizing the link 310. Additionally, in some examples, an area of the link 310 behind the third and fourth pins 340, 344 is supported by at least one component of the assembly 300, which prevents the link 310 from twisting during high loading conditions and/or reduces related noise during vibration. In such examples, the overmolded portion 720 defines a support surface (e.g., a relatively long, flat surface) 908 of the link 310 facing away from the drive shoe 308. The support surface 908 may be substantially smooth and/or continuous. As shown in FIG. 9, the support surface 908 extends along the overmolded portion 720 from the third pin 340 to the fourth pin 344. Further, the support surface 908 extends past or beyond both the third and fourth pins 340, 344. The support surface 908 of FIG. 9 may extend in the length direction of the link 310 across a fourth distance 910 substantially equal to or greater than the third distance 906. In such examples, the support surface 908 is configured to abut, for example, a side portion 912 of the rail 304 defining at least a part of the primary guide channel 402, thereby providing support to the third and fourth pins 340, 344 and/or further stabilizing the link 310.

In FIG. 9, the overmolded portion 720 is positioned and/or held between the side portion 912 of the rail 304 and the drive shoe 308, where the touch points 902 and 904 and support surface 908 are substantially engaged with the respective drive shoe 308 and side portion 912. As a result, a substantially even force distribution is provided for the link 310 in its interaction with the rail 304 and the drive shoe 308, which reduces and/or eliminates binding and/or increases system efficiency. In some examples the touch points 902 and 904 are configured to abut the drive shoe 308 at all states of the sunroof 102 to provide the support to the first and second pins 320, 324 and prevent the twisting of the link 310 previously described, and the support surface 908 is configured to abut the rail 304 (or the first guide block 334) at all states of the sunroof 102 to provide the support to the third and fourth pins 340, 344 and further prevent the twisting of the link 310. As a result of such an engagement scheme associated with the touch points 902 and 904, the drive shoe 308, the support surface 908, and the rail 304, a certain amount of a cross-car rotation associated with the drive mechanism 306 is reduced and/or eliminated during sunroof operation without impeding the functionality of the drive mechanism 306.

Figure 10:
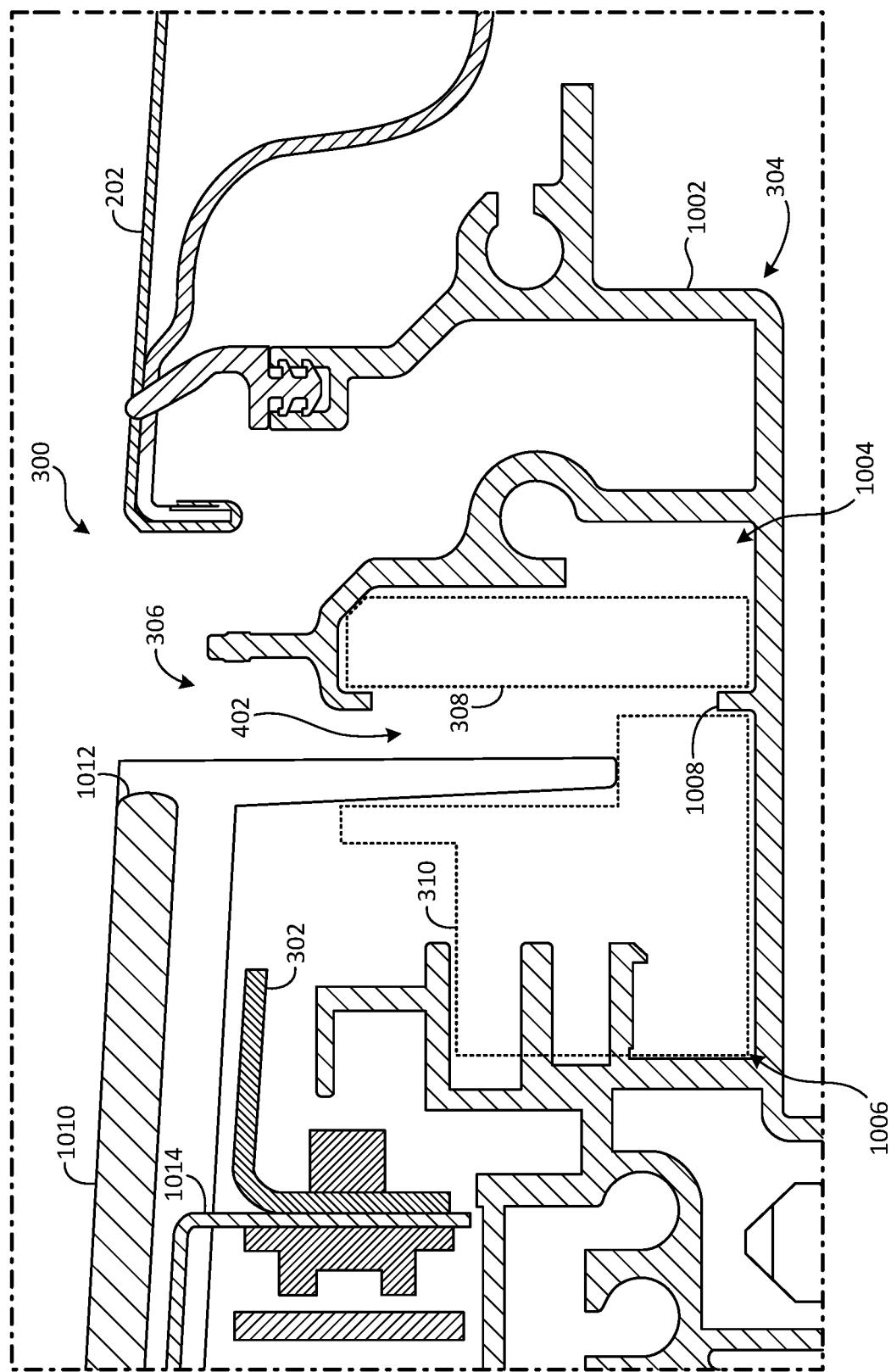
FIG. 10 is a cross-sectional view of the example assembly along line E-E of FIG. 9 and shows positioning associated with the example drive mechanism and the example sunroof rail.

FIG. 10 is a cross-sectional view of the sunroof assembly 300 along line E-E of FIG. 9 and shows positioning associated with the drive mechanism 306 and the rail 304. Each of the drive shoe 308 and the link 310 is substantially represented by the dotted/dashed lines of FIG. 10. In some examples, the rail 304 is provided with a rail body (e.g., an extruded body or an extrusion) 1002 supported by the roof 202 that forms and/or defines the primary guide channel 402. The primary guide channel 402 may linearly extend through the rail body 1002 along an axis. In some examples, the primary guide channel 402 is arranged along a length of the rail 304 or at least part of the length. In particular, the primary guide channel 402 of FIG. 10 is sized and/or shaped to receive the drive mechanism 306 (including the drive shoe 308 and the link 310) and guide movement of the drive mechanism 306 through the primary guide channel 402 during sunroof operation. Similarly, in some examples, the primary guide channel 402 is sized and/or shaped to receive the catch device 372 and guide movement of the catch device 372 through the primary guide channel 402.

In FIG. 10, each of the drive shoe 308 and the link 310 is positioned in the primary guide channel 402 (i.e., in the rail 304) and can travel along a path provided by the primary guide channel 402. In some examples, when the drive shoe 308 of FIG. 10 slides through the primary guide channel 402, one or more inner surfaces of the rail body 1002 slidably engage the drive shoe 308 to substantially maintain an orientation of the drive shoe 308 relative to the rail 304. In particular, the rail body 1002 of FIG. 10 can be configured to maintain the orientation of the drive shoe 308 at all of positions of the drive shoe 308.

To better guide movable components of the sunroof assembly 300, the primary guide channel 402 may be comprised of multiple channels. That is, in some examples, the rail 304 or the body 1002 thereof defines multiple guide channels, each of which extends at least partially across the length of the rail 304 to receive and guide a movable sunroof component. As shown in FIG. 4, a first guide channel 1004 of the multiple guide channels is sized and/or shaped to receive the drive shoe 308, while a second guide channel 1006 of the multiple guide channels is sized and/or shaped to receive the link 310. The second guide channel 1006 is adjacent the first guide channel 1004 and may be at least partially separated from the first guide channel 1004 by an example protrusion 1008 projecting from a bottommost (in the orientation of FIG. 10), inner surface of the rail body 1002.

According to the illustrated example of FIG. 10, the assembly 300 is provided with an example sunroof panel (e.g., glass) 1010 that is held by the bracket 302, which may correspond to the first or second panel 204, 206 previously described. The bracket 302 of FIG. 10 is arranged beneath a side portion 1012 of the sunroof panel 1010 and can extend at least partially across a length of the sunroof panel 1010. The side portion 1012 of the sunroof panel 1010 can include an edge of the sunroof panel 1010 or an area adjacent the edge extending across the length of the sunroof panel 1010. Additionally, the bracket 302 is connected to the sunroof panel 1010, for example, directly and/or via one or more intermediate components interposed between the bracket 302 and the sunroof panel 1010, such that the bracket 302 provides support to the sunroof panel 1010 or at least the side portion 1012 thereof. In FIG. 10, a first intermediate component 1014 extending from the bracket 302 to the sunroof panel 1010 is fixedly coupled to the bracket 302 and the sunroof panel 1010, for example, via one or more fasteners and/or one or more fastening methods or techniques.

Figure 11:
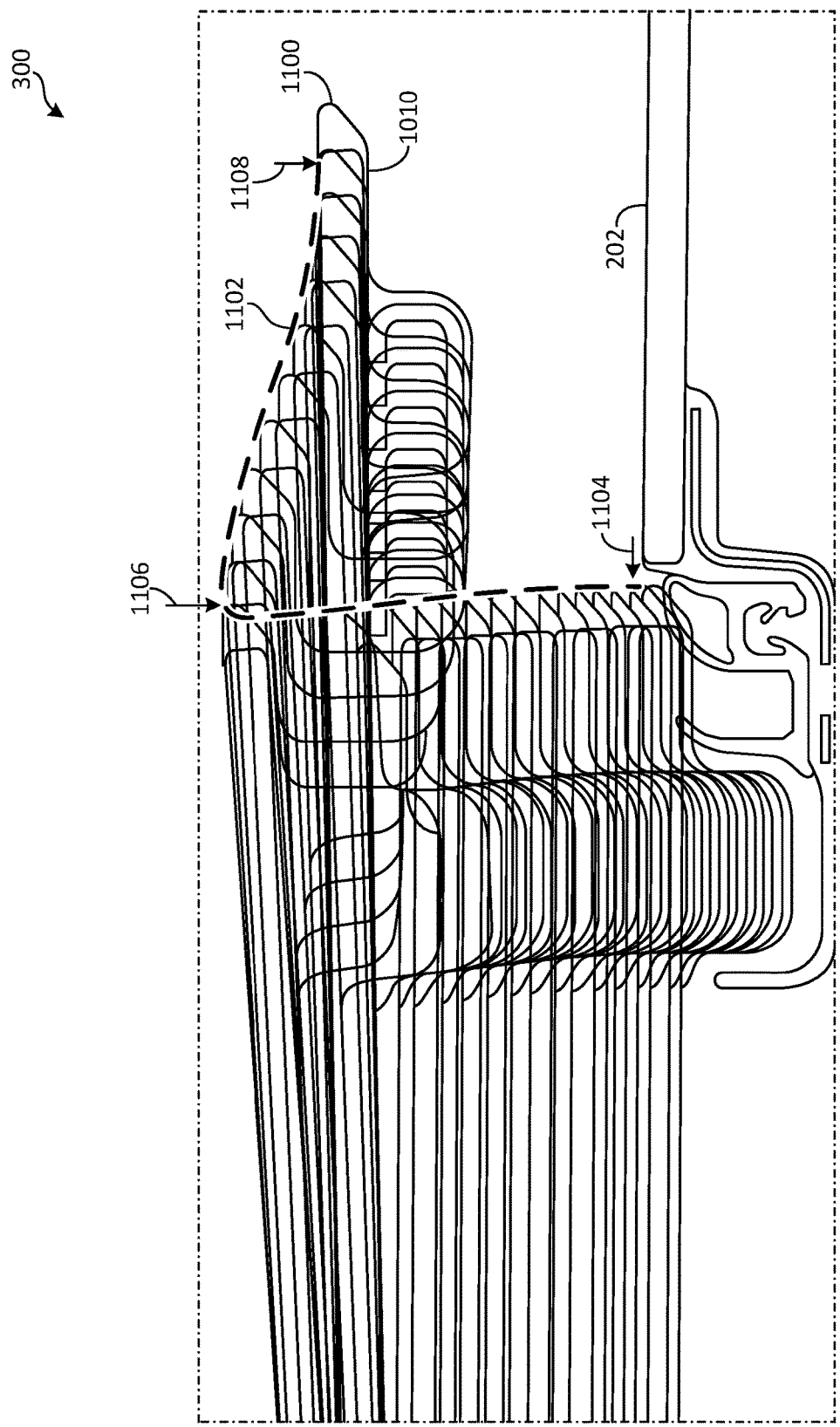
FIG. 11 is a side-view of the example assembly and shows example panel motion provided by the example drive mechanism.

FIG. 11 is a side-view of the sunroof assembly 300 and shows example panel motion provided by the drive mechanism 306. Initial or beginning stages of the sunroof opening operation with respect to the panel 1010 held by the bracket 302 are depicted in the illustrated example of FIG. 11, where an end (e.g., a rear end) 1100 of the panel 1010 and the first end 350 of the bracket 302 (not shown) are moving relative to the roof 202 of the vehicle 100. The end 1100 of the panel 1010 shown in FIG. 11 corresponds to the first end 350 of the bracket 302. Further, movement of the end 1100 of the panel 1010, as depicted in FIG. 11, is similar and/or corresponds to movement of the first end 350 of the bracket 302. In particular, the panel motion provided by the drive mechanism 306 is substantially efficient and/or continuous in appearance, as discussed further below. To initiate such panel motion, the drive shoe 308 is first moved relative to the link 310 from the first drive shoe position to the third drive shoe position, which rotates the link 310 about the second axis 329 in the first rotational direction 374 (i.e., a single rotational direction) from the first orientation of the link 310 to the target orientation of the link 310, as previously described. Then, after the drive mechanism 306 changes from the first state to the second state resulting from interaction of the first pin 320 and the locking area 434, the drive shoe 308 drags or pulls the link 310 and the bracket 302 along the rail 304 to fully open the sunroof 102.

According to the illustrated example of FIG. 11, the end 1100 of the panel 1010 travels along a certain path 1102 created by the drive mechanism 306 while the sunroof 102 is opening, which is represented by the dotted/dashed lines of FIG. 11. For example, as the link 310 moves from the first orientation to the target orientation, the end 1100 of the panel 1010 is urged to travel across a first part of the path 1102 from a first point 1104 on the path 1102 to a second point 1106 on the path 1102 different from the first point 1104, where the end 1100 of the panel 1010 moves away from the roof 202 of the vehicle 100. The first point 1104 of FIG. 11 corresponds to a minimum height position of the end 1100 of the panel 1010. Accordingly, the first point 1104 of FIG. 11 also corresponds to a minimum height position of the first end 350 of the bracket 302. On the other hand, the second point 1106 of FIG. 11 corresponds to a maximum height position of the end 1100 of the panel 1010 as well as a maximum height position of the first end 350 of the bracket 302. In particular, the target orientation of the link 310 is achieved when the end 1100 of the panel 1010 reaches the second point 1106 on the path 1102. Then, as the drive shoe 308 drags or pulls the link 310 and the bracket 302 along the rail 304 in the first direction 316, the end 1100 of the panel 1010 is urged to travel across a subsequent or second part of the path 1102 from the second point 1106 to a third point 1108 on the path 1102 different from the second point 1106, where the end 1100 of the panel 1010 moves slightly toward the roof 202 as a result of the second end 352 of the bracket 302 being lifted via the second guide block 358. As such, the third point 1108 of FIG. 11 corresponds to an intermediate height position of the end 1100 of the panel 1010 as well as an intermediate height position of the first end 350 of the bracket 302.

It will be appreciated that the systems, apparatus, and methods disclosed in the foregoing description provide numerous advantages. Examples disclosed herein provide drive mechanisms that can be used to advantageously control motion of a sunroof bracket and/or a panel held by the sunroof bracket during operation of a sunroof. Examples disclosed herein provide for more compact and/or lightweight sunroof architecture while improving performance associated with such sunroof mechanisms.

Although certain example systems, apparatus, and methods have been disclosed herein, the scope of coverage of this patent is not limited thereto. Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. An assembly for a sunroof of a vehicle, comprising:
   a sunroof panel;
   a rail extending in a length direction of the vehicle, the rail including multiple guide channels to receive and guide movable sunroof components;
   a guide block attached to a part of the rail between a first end of the rail and second end of the rail opposite to the first end;
   a bracket beneath the sunroof panel and supporting the sunroof panel, the bracket including a first end and a second end opposite to the first end that is a pivot point of the bracket, the bracket configured to pivot about the pivot point relative to the rail to change a state of the sunroof;
   a link in the rail removably connected to the guide block, a first end of the link pivotably coupled to a part of the bracket between the first and second ends of the bracket, the link including a first pin positioned at an intermediate portion of the link and a second pin, spaced from the first pin, positioned at a second end of the link opposite to the first end; and
   a drive shoe in the rail slidably coupled to the link, the drive shoe including a first slot extending through the drive shoe configured to receive the first pin and guide the first pin through a part of the drive shoe to control an angular motion parameter of the link, the drive shoe including a second slot extending through the drive shoe configured to receive the second pin and guide the second pin through a different part of the drive shoe to provide and maintain a rotation axis of the link, movement of the drive shoe relative to the link rotating the link about the rotation axis from a first orientation in which the link is inseparable from the guide block to a target orientation in which the link is separable from the guide block, the drive shoe including a locking area at an end of the first slot to receive and hold the first pin during sunroof operation, and when the first pin enters the locking area, the drive shoe is configured to impart one or more loads on the first pin that urge the link into the target orientation and enable the link and the bracket to slide along the rail together with the drive shoe in the length direction of the vehicle.

2. The assembly of claim 1, wherein the locking area has a first width that is greater than a second width of a section of the first slot adjacent the locking area, and when the first pin is in the locking area, the drive shoe directly contacts a front portion of the first pin and a rear portion of the first pin opposite to the front portion.

3. The assembly of claim 1, wherein first slot defines a non-linear path along which the first pin is to travel extending from the end of the first slot to an opposite end of the first slot, and wherein the second slot defines a linear path along which the second pin is to travel extending from an end of the second slot to an opposite end of the second slot.

4. The assembly of claim 3, wherein the non-linear path extends in a length direction of the drive shoe and a height direction of the drive shoe, and wherein the linear path extends only in the length direction of the drive shoe.

5. The assembly of claim 1, wherein,
   the first and second pins are positioned on a first side of the link,
   the link includes third and fourth pins between the first and second pins and positioned on a second side of the link opposite to the first side of the link, and
   the guide block includes third and fourth slots extending through the guide block to receive the respective third and fourth pins, the third and fourth pins configured to slide through respective third and fourth slots in the guide block to provide support to the link as the link rotates, where the third and fourth pins remain in direct contact with the guide block at all orientations of the link to reduce operational noise.

6. The assembly of claim 5, wherein the link includes an overmolded portion covering the first, second, third and fourth pins and positioned between a side portion of the rail and the drive shoe, the overmolded portion defining first and second touch points configured to abut the drive shoe at all states of the sunroof to provide support to the first and second pins and prevent twisting of the link, the overmolded portion defining a support surface that extends from the third pin to the fourth pin configured to abut the rail or the guide block at all states of the sunroof to provide support to the third and fourth pins and further prevent twisting of the link.

7. The assembly of claim 5, wherein the link includes a link body to which the first, second, third, and fourth pins are coupled, the link including at least one bead defined by the link body and the first, second, third, or fourth pin configured to reduce stress in the link resulting from a load applied to the link.

8. The assembly of claim 1, wherein the link includes an elongated bead coupled thereto configured to increase a cross-sectional stiffness of the link, the elongated bead extending in a length direction of the link between the first and second ends of the link.

9. The assembly of claim 8, wherein the elongated bead includes a first linear segment arranged along a part of link and a second linear segment adjacent the first linear segment arranged along a different part of the link, the first linear segment angled relative to the second linear segment.

10. The assembly of claim 8, wherein the link includes a flange coupled thereto configured to increase rigidity of the link, the flange adjacent the elongated bead and curving away from the elongated bead.

11. The assembly of claim 1, wherein:
the first orientation of the link provides a fully lowered position of the first end of the bracket,
the target orientation of the link provides a fully raised position of the first end of the bracket, and
movement of the drive shoe relative to the link from an initial drive shoe position to a final drive shoe position rotates the link about the rotation axis in a single rotational direction from the first orientation to the target orientation.

\* \* \* \* \*